United States Patent [19]

Hart et al.

[11] Patent Number: 4,706,081

[45] Date of Patent: Nov. 10, 1987

[54] METHOD AND APPARATUS FOR BRIDGING LOCAL AREA NETWORKS

[75] Inventors: John H. Hart, Campbell; Frederick J. Baker, Santa Clara, both of Calif.

[73] Assignee: Vitalink Communications Corporation, Fremont, Calif.

[21] Appl. No.: 682,061

[22] Filed: Dec. 14, 1984

[51] Int. Cl.[4] .......................... H04Q 11/04; H04J 3/00
[52] U.S. Cl. ................................. 340/825.03; 370/61; 370/94; 375/7
[58] Field of Search ........... 340/825.03, 825.5, 825.05, 340/825.02, 825.03; 375/7, 8; 370/60, 61, 62, 94, 91, 94 U, 85

[56] References Cited

U.S. PATENT DOCUMENTS

| 4,316,283 | 2/1982 | Ulug | 370/94 U |
| 4,375,097 | 2/1983 | Ulug | 370/94 U |
| 4,509,167 | 4/1985 | Bantel et al. | 370/62 |
| 4,539,679 | 9/1985 | Bux et al. | 370/85 |
| 4,547,880 | 10/1985 | DeVita et al. | 370/91 |

OTHER PUBLICATIONS

The Ethernet, a Local Area Network Data Link Layer and Physical Layer Specifications, Version 2.0, Nov. 1982.
IEEE Project 802, Local Area Network Standards, IEEE Computer Society, Jul. 1983.
Ethernet System Product Line, Communications Server User's Guide, Feb. 1984, Bridge Communication Inc. (updated copy of the May 1982 Document 2.4 Listed at p. 39 OP Specification).
ESPL Software Technical Reference Manual, vols. 1, 2, and 3, all Jul. 1983, Bridge Communication Inc.

Primary Examiner—Donald J. Yusko
Attorney, Agent, or Firm—Donald C. Feix

[57] ABSTRACT

A communications system interconnects local Area Networks (LAN's) across broadcast simplex channels. The LAN's are connected independently and transparently of protocols above the data link layer so that the system appears to the user at a station in one Local Area Network as one large single network. A bridge interconnects the LAN's across simplex channels. The bridge is constructed to permit more than two local area networks to be interconnected across simplex channels to the bridge and to provide communication between stations.

19 Claims, 23 Drawing Figures

ONE CONFIGURATION OF THE PRESENT INVENTION

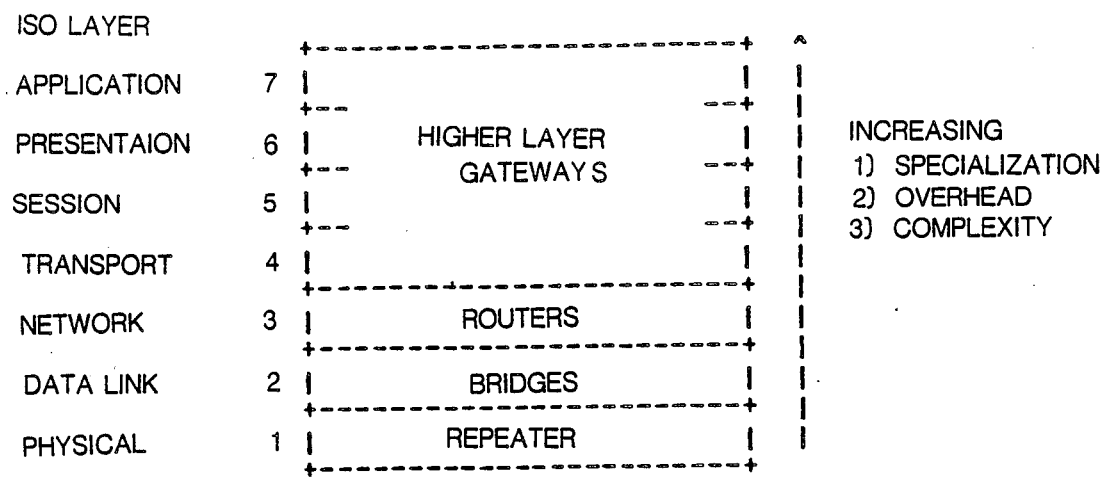
FIG. 1 - LAN INTERCONNECT TAXONOMY

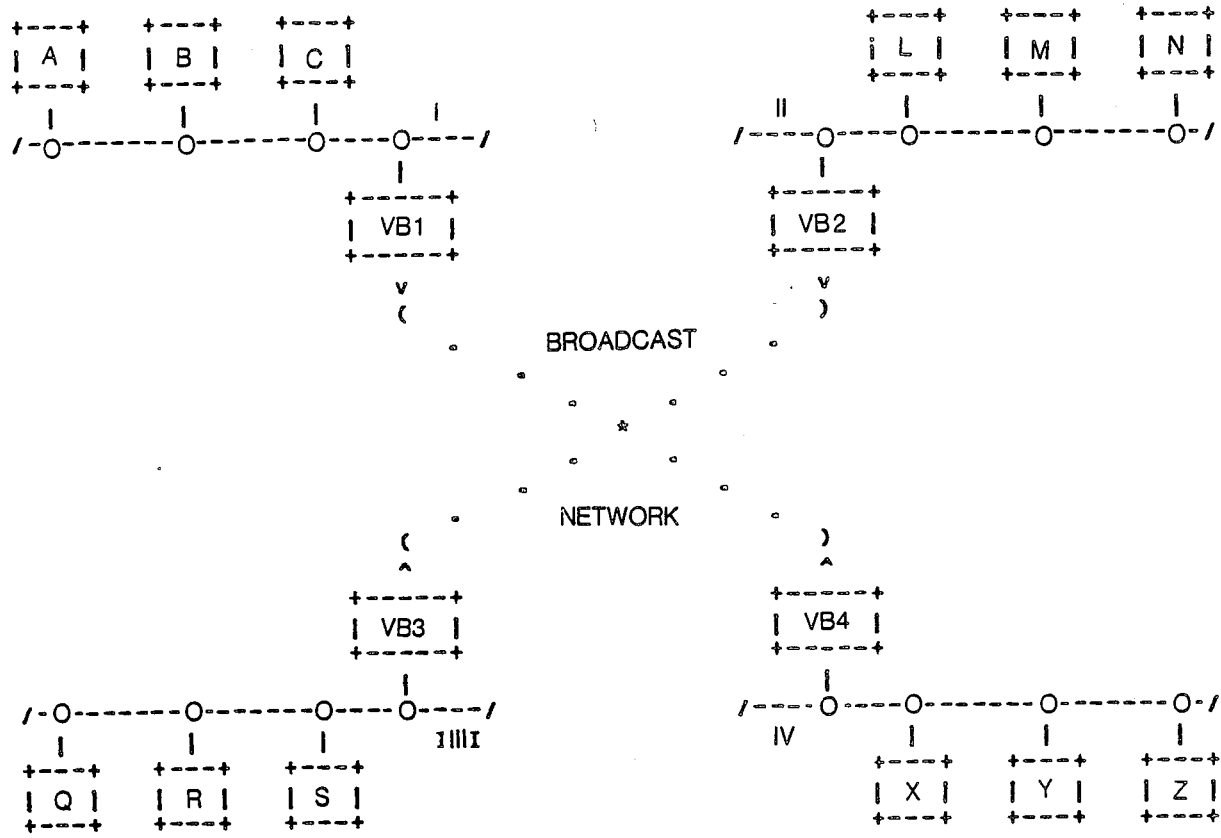
A-Z LAN STATIONS
VB1-4 VITALINK BRIDGES
I-IV ETHERNET /802.3 LAN'S
FIG. 2 - ONE CONFIGURATION OF THE PRESENT INVENTION

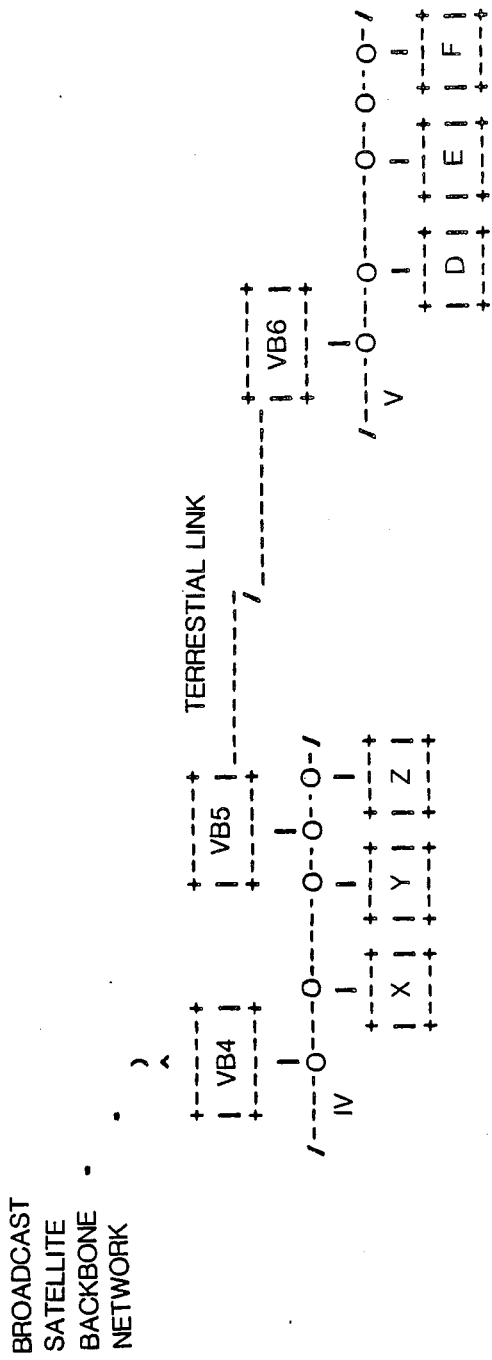
FIG. 3 – ADDITION TO FIGURE 2 USING A TERRESTIAL LINE
FIG. 4 – INTERCONNECTING 2 VITALINK BRIDGES

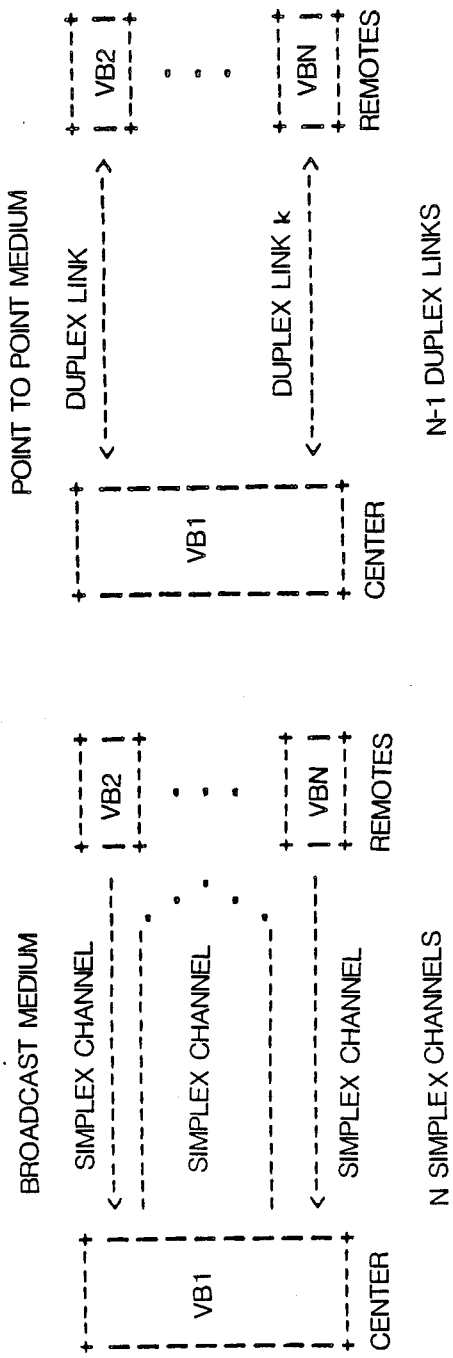
FIG. 5 - STAR TOPOLOGIES

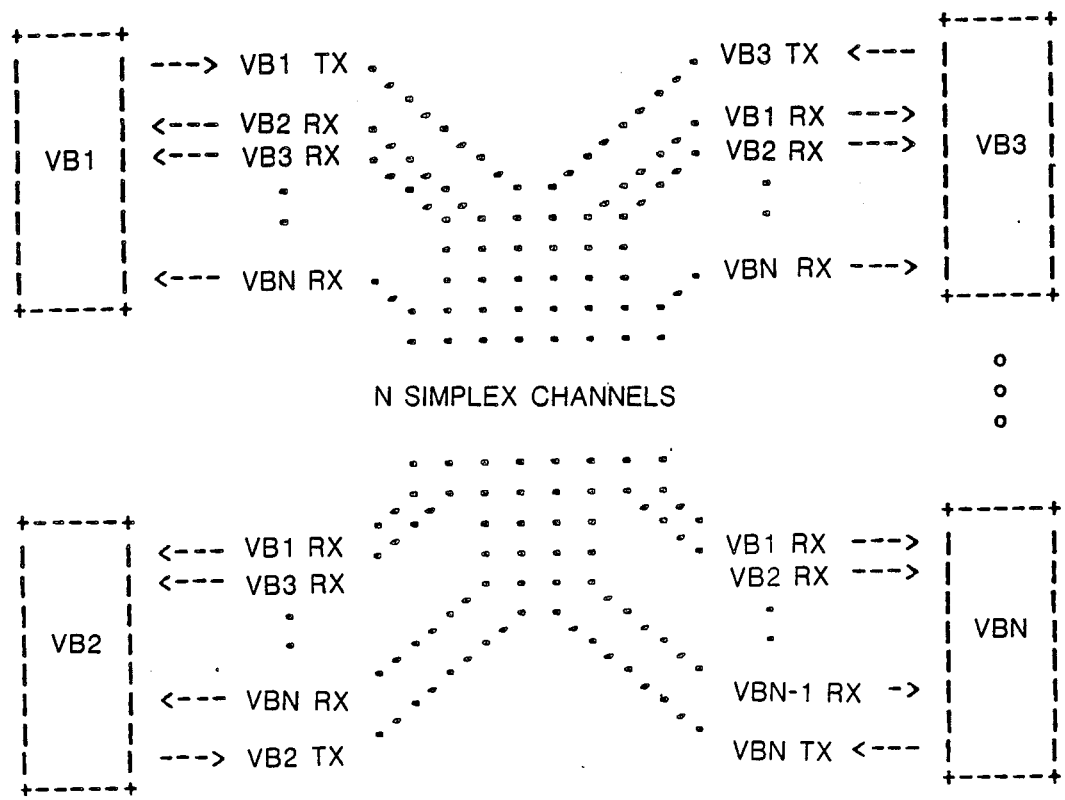
FIG. 6 - FULLY CONNECTED TOPOLOGY
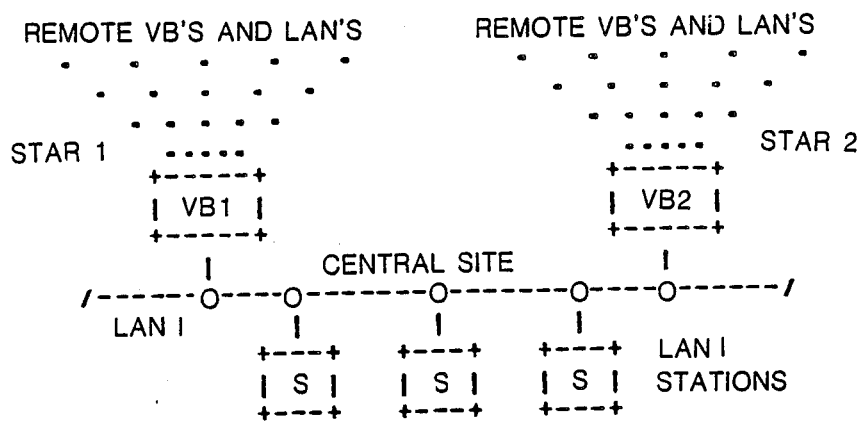
FIG. 7 - DOUBLE STAR TOPOLOGY

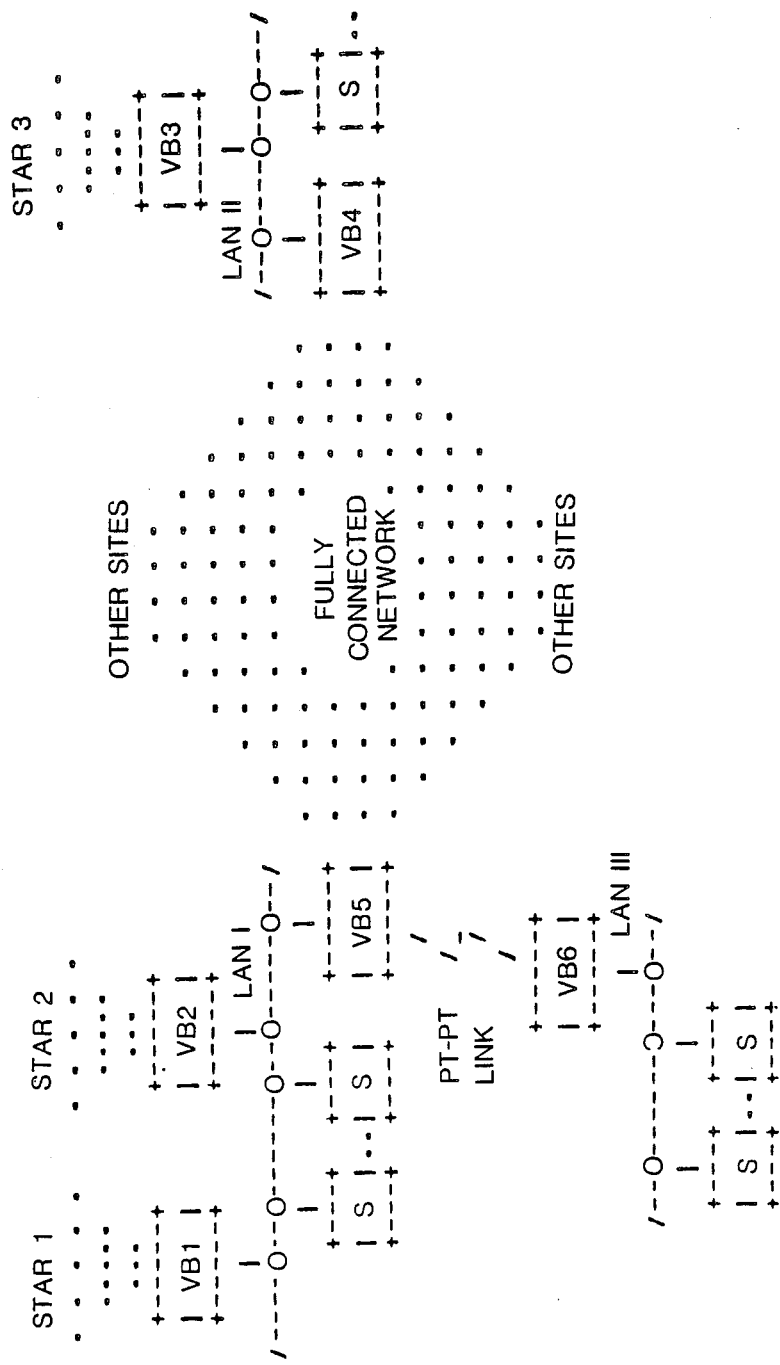
FIG. 8 - EXPANDED FIGURE 7 CONFIGURATION

EXPANDED CONFIGURATION
STAR 1 + LAN I + STAR 2
+ FULLY CONNECTED +
LAN II + STAR 3
PT-PT LINK +
LAN II
ETC
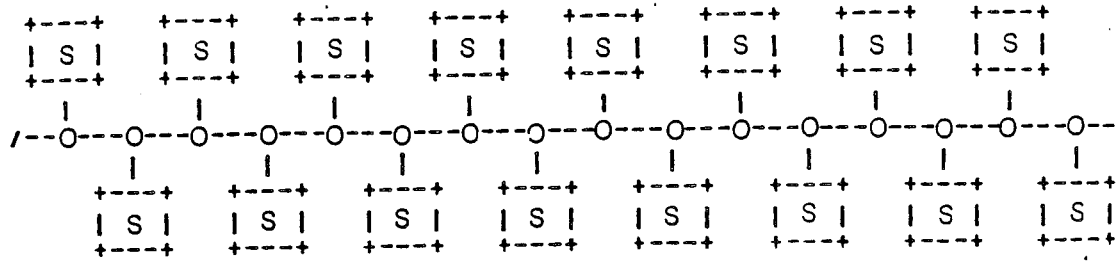
FIG. 9 - USER PERSPECTIVE
FIG. 10
PRIMARY ROLE OF VITALINK          BRIDGE
SATELITE BACKBONE
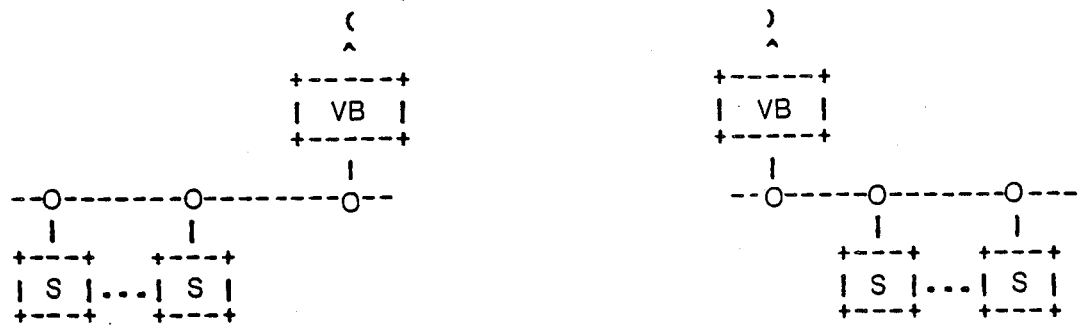
VB = VITALINK BRIDGE
S = ETHERNET/802.3 LAN STATIONS

FIG. 15
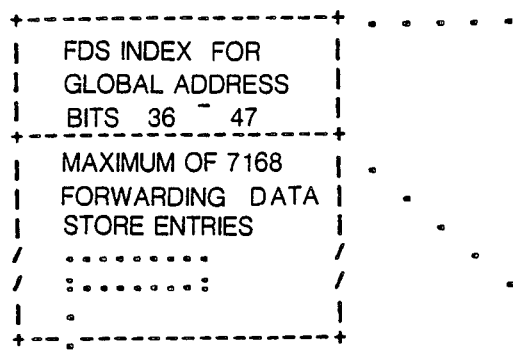
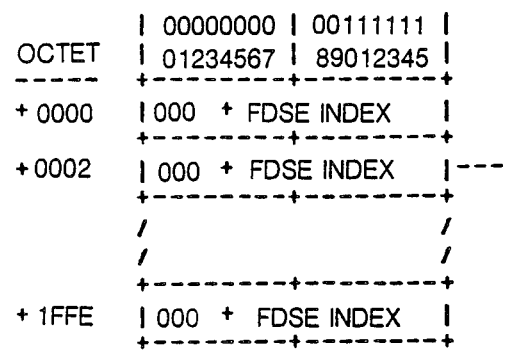
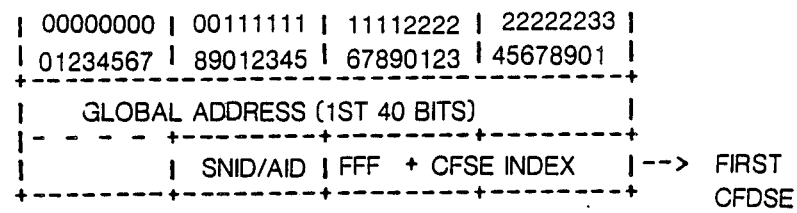
FIG. 16
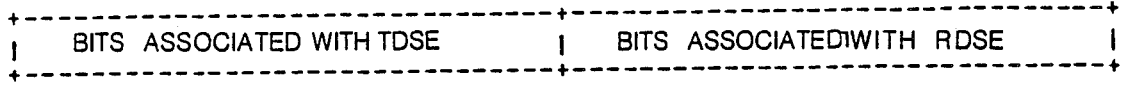

METHOD AND APPARATUS FOR BRIDGING LOCAL AREA NETWORKS

BACKGROUND OF THE INVENTION

This invention relates to methods and apparatus for bridging together local area networks.

This invention relates particularly to a communication system for interconnecting multiple local area networks across broadcast simplex channels independently and transparently of protocols above the data link layer so that the system appears to a user at a station in a local area network as one large single network.

Ethernet networks and/or 802.3 Local Area Networks (LAN's) are being installed in conjunction with a wide variety of office automation and data communication products. The LAN's are used to interconnect a number of products which use various network architectures (e.g., TCP/IP, XNS, DECnet, etc.). As additional LAN's are installed in other locations the need to link together the remote LAN's is often initially ignored. Then, when interconnect options for interconnecting the remote LAN's are investigated, it often becomes apparent that the simple, multipurpose data highway environment (that exists within a building or a single LAN) has disappeared.

Connecting a number of remote LAN's can present problems in software and can also present problems in complex mult-vendor compatibility. The architecture for interconnection can also become an issue. Redundant configurations for different internet protocols may be required, and some to the LAN stations may not support an internet implementation.

SUMMARY OF THE PRESENT INVENTION

It is a primary object of the present invention to interconnect multiple Local Area Networks by a communications system which avoids problems presented by prior art techniques.

It is a specific object of the present invention to connect more than two Local Area Networks across simplex channels through a bridge and to provide communication between stations.

It is a related object to communicate with one or more stations and one or more remote Local Area Networks independently and transparently of protocols above the data link layer so that the system appears to a user at a station in a Local Area Network as one large single network.

In accordance with the present invention a plurality of Local Area Networks are connected together by multiple bridges. Each Local Area Network has at least one station for sending or receiving communications to or from another station using data link frames containing at least a destination address and a source address. The bridge interconnects the Local Area Networks across simplex channels and permits one or more stations in one Local Area Network to communicate with one or more stations in one or more of the other Local Area Networks independently and transparently of protocols above the data link layer.

The bridge is constructed to permit more than two Local Area Networks to be interconnected across simplex channels through the bridge.

In the present invention there are four basic novel principles involved in the operation of the system.

First, a simplex channel is associated with one and only one network.

Secondly, at each bridge a network has one and only one output simplex channel and one or more input simplex channels.

Thirdly, from the standpoint of the bridge, all networks and LAN's can be defined in terms of simplex channels.

Fourthly, a bridge is capable of bridging between more than two networks and LAN's.

Communication system apparatus and methods which incorporate the structures and techniques described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a diagram illustrating a taxonomy for describing Local Area Network (LAN) interconnection.

FIG. 2 is a view of four Ethernet networks bridged together across a satellite network in accordance with one embodiment of the present invention.

FIG. 3 illustrates how the FIG. 2 configuration can be expanded using a terrestrial line.

FIG. 4 illustrates how two bridges can be interconnected in accordance with the present invention using either a broadcast medium or a point to point medium (e.g., a terrestrial data link).

FIG. 5A is a four node network and illustrates the simplex channel used for star configuration.

Figure 5A:
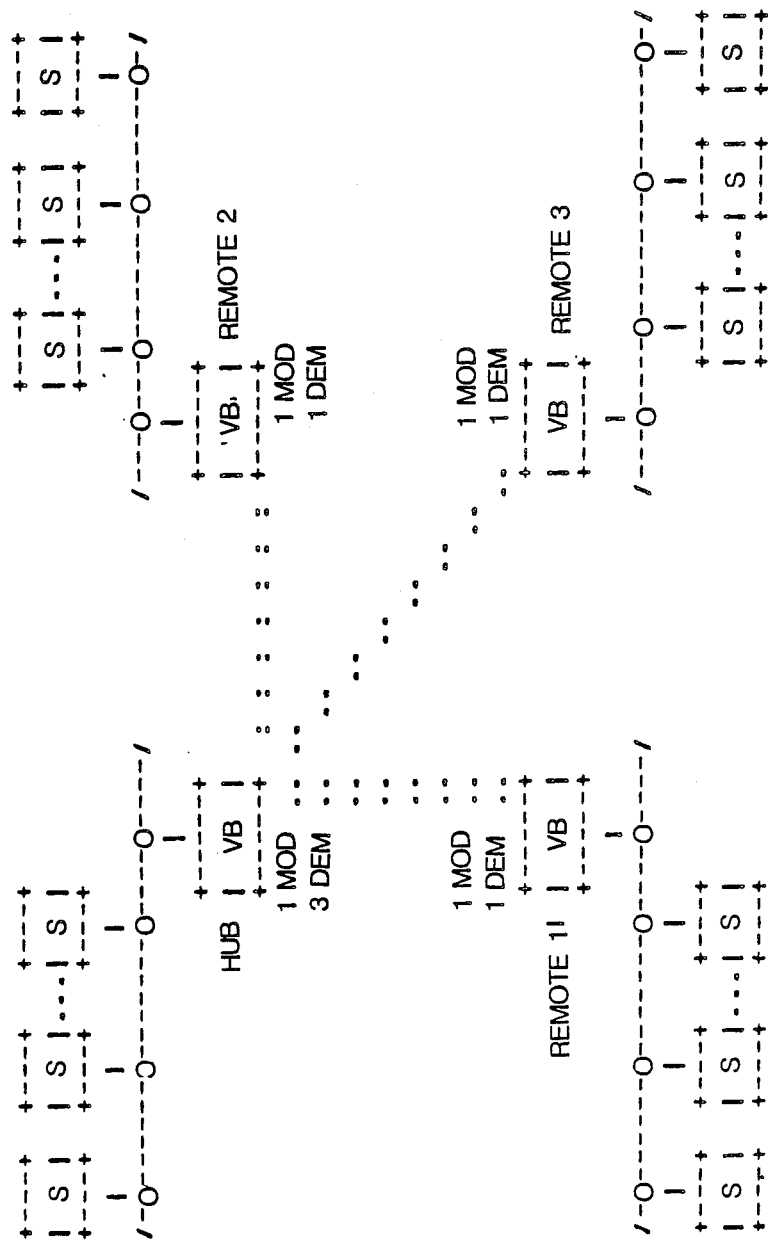
FIG. 5A is a view like FIG. 5 showing a star topology.
Figure 5B:
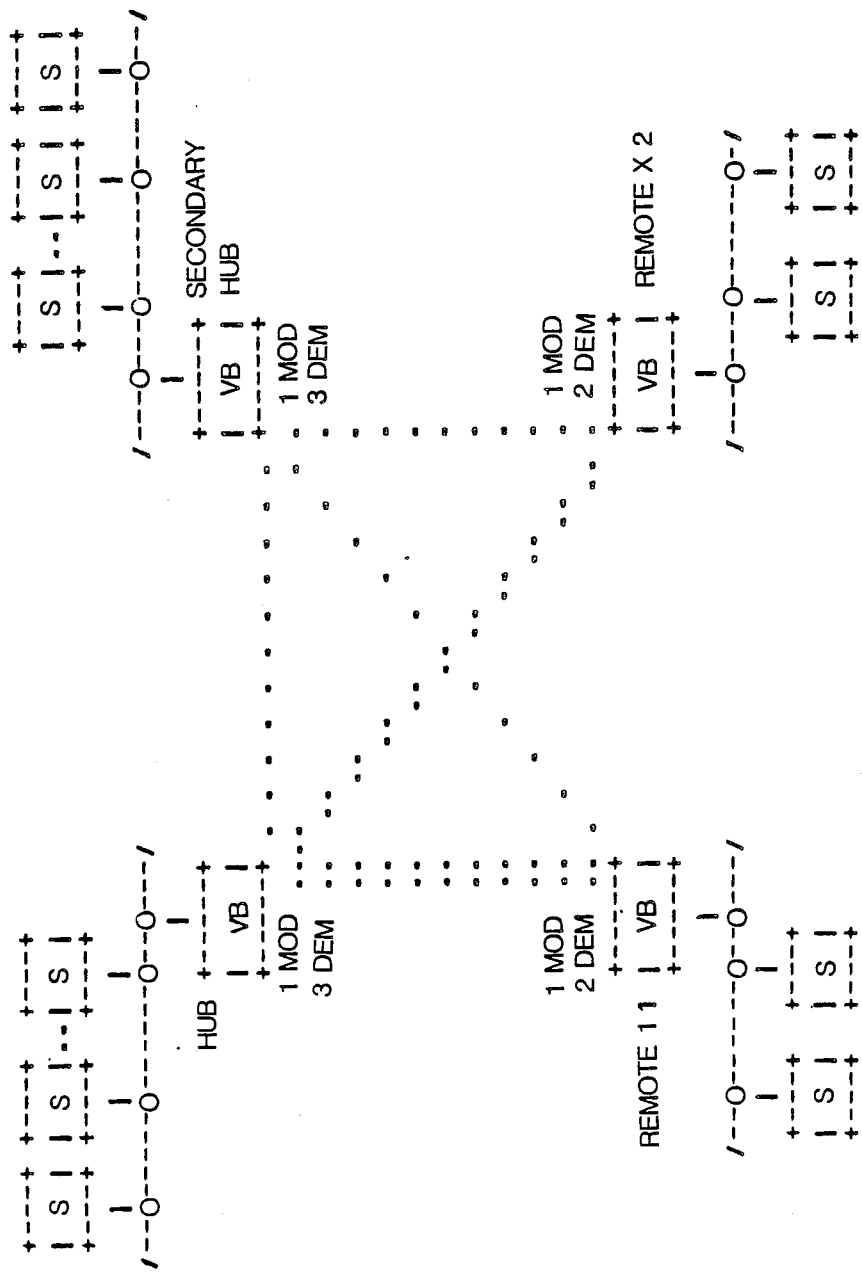
FIG. 5 is a comparison view showing the use of simplex channels including a single broadcast simplex channel for star communications contrasted with the use of multiple point to point duplex links for star communications.

FIG. 5B illustrates another topology. In FIG. 5B a four node network is connected in what is referred to as multistar topology. FIG. 5B illustrates the simplex channels required to support that topology.

FIG. 6 shows how simplex channels are used in accordance with the present invention to support a fully connected topology. FIG. 6 is a view like FIG. 2 but emphasizing and illustrating the simplex channels.

FIG. 7 illustrates a configuration containing two star topologies connected to a LAN in the central site.

FIG. 8 is a view of an expanded FIG. 7 configuration. FIG. 8 shows a communication system constructed in accordance with the present invention and embodying a fully connected network. FIG. 8 illustrates how star configurations are connected through a Local Area Network, and how a number of those locations can be connected by a fully connected network. FIG. 8 illustrates the actual configuration (as distinct from the user perspective). The user perspective is illustrated in FIG. 9.

FIG. 9 is a diagrammatic view showing the user perspective of a communication system incorporating the present invention. As illustrated in FIG. 9 the overall configuration is viewed by all LAN stations as containing a single LAN.

FIG. 10 illustrates the primary role of the bridge of the present invention.

Figure 11:
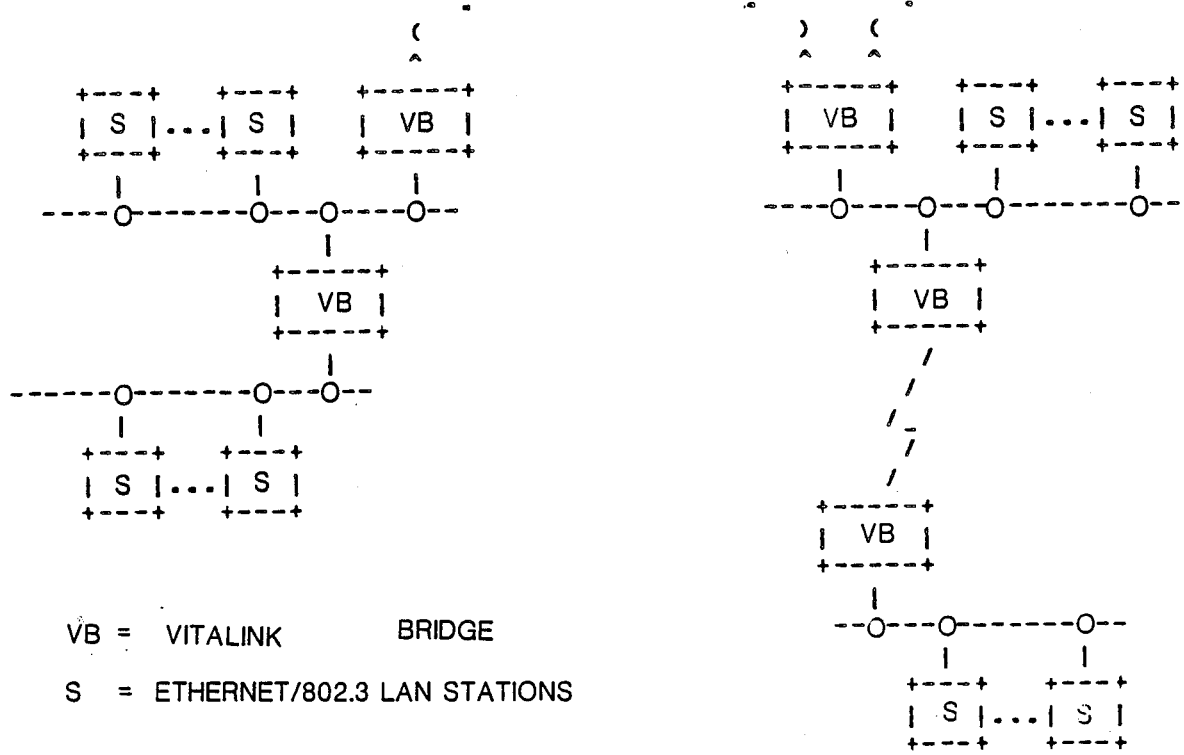

FIG. 11 illustrates secondary roles of the bridge of the present invention.

Figure 12:
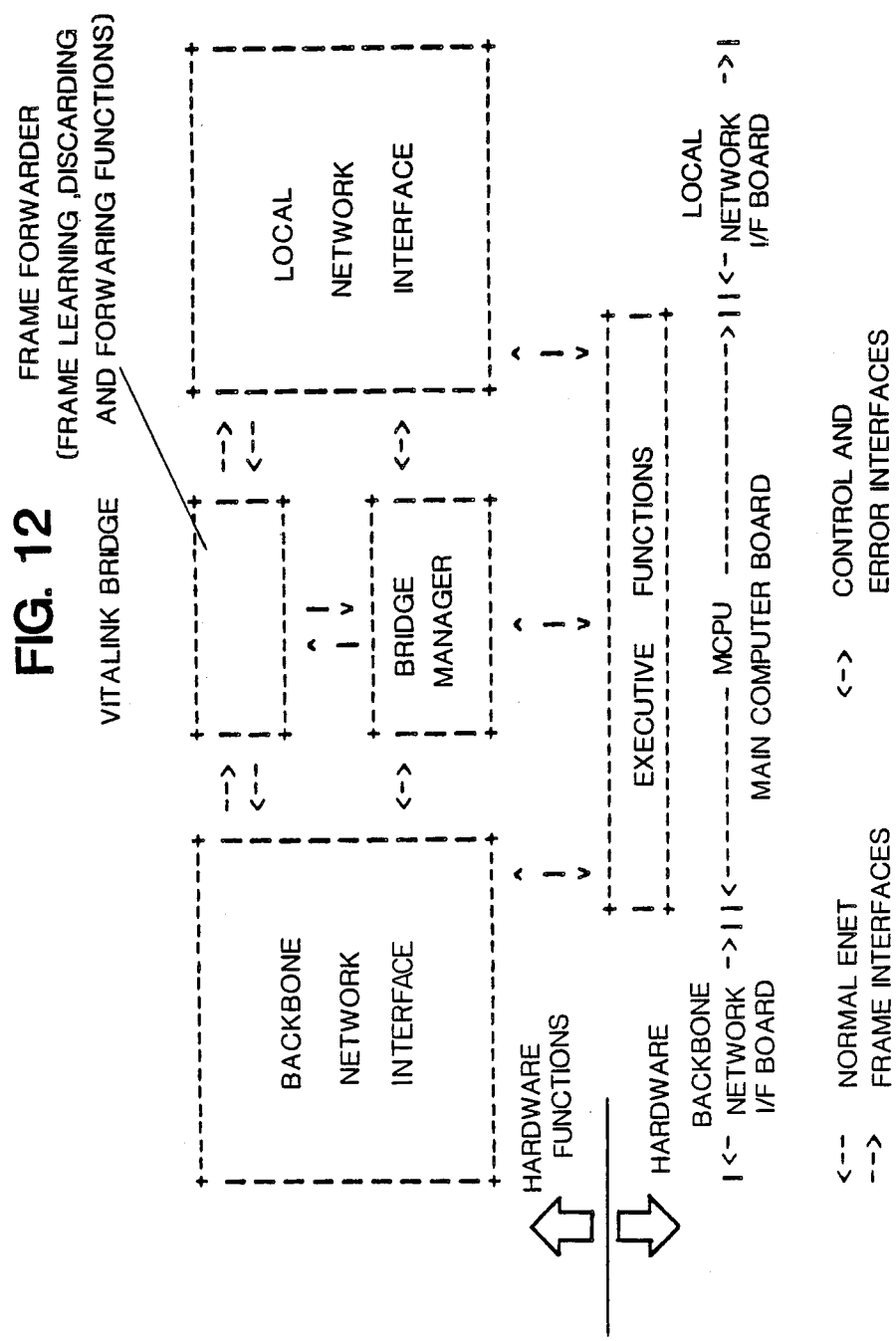

FIG. 12 is a view of a bridge constructed in accordance with one embodiment of the present invention. FIG. 12 shows major component parts of the bridge. Subsequent figures of the drawings show further details of these component parts.

Figure 13:
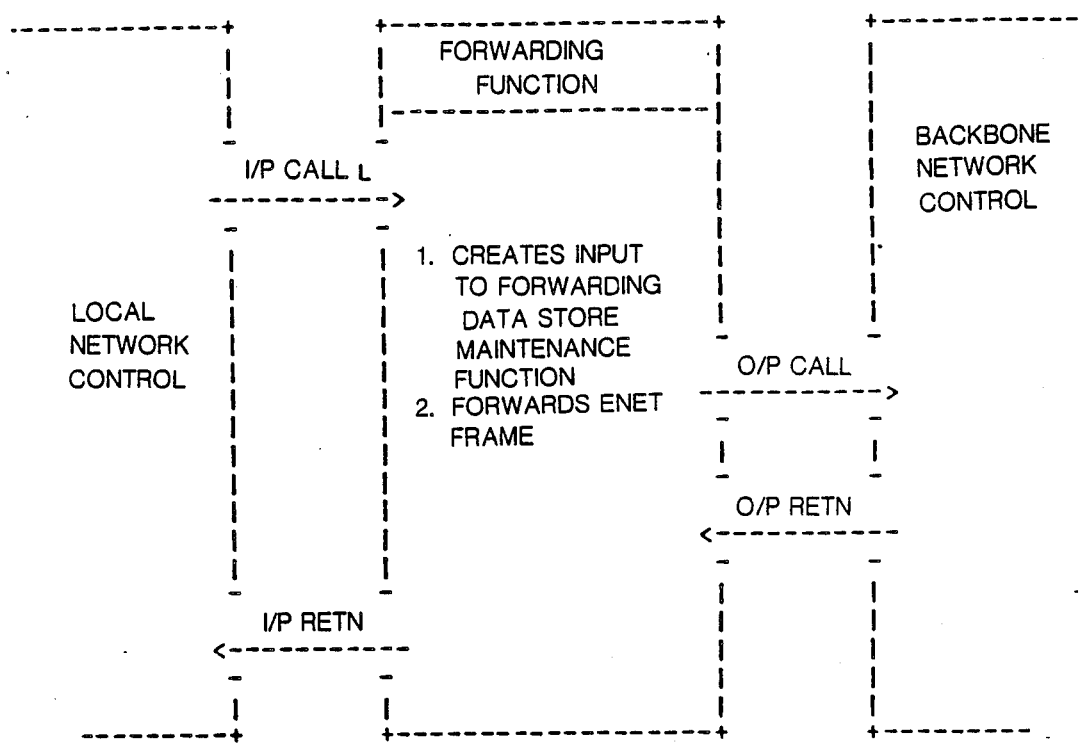

FIG. 13 illustrates features of the forwarding function of the bridge.

Figure 14:
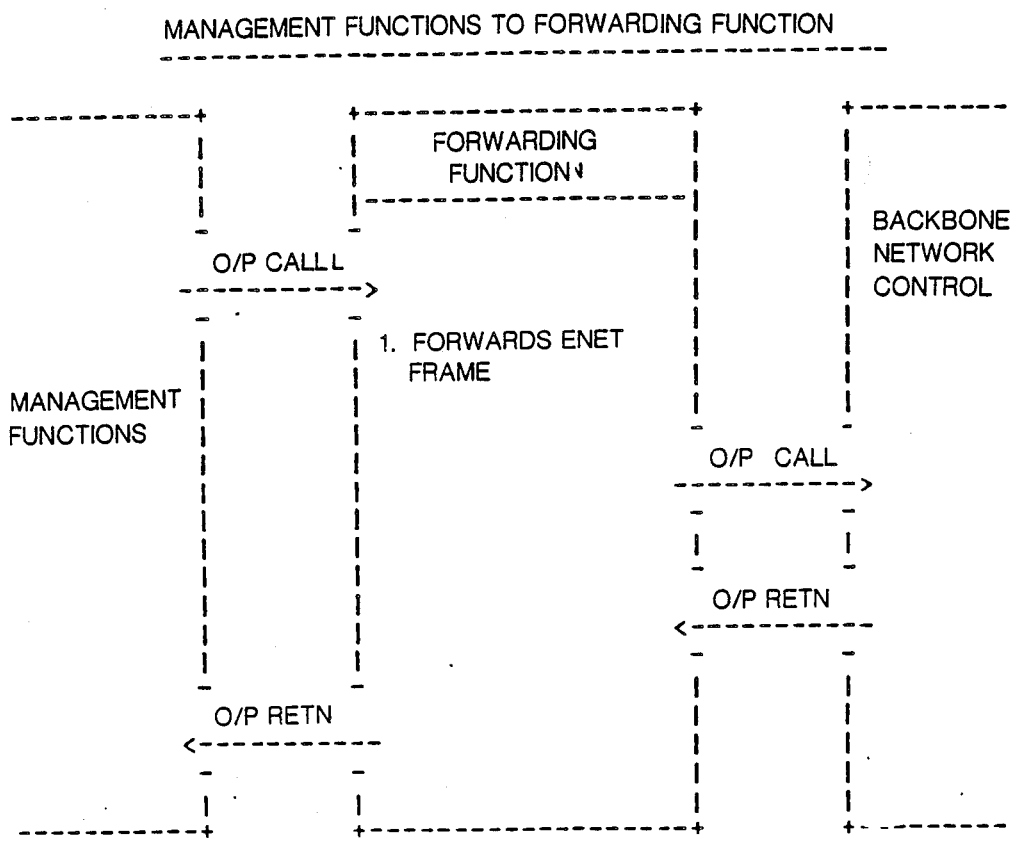

FIG. 14 illustrates features of the management functions of the bridge.

FIG. 15 shows the format of a forwarding data store incorporated in the bridge of the present invention.

FIG. 16 shows details of a multicast array data store entry structure as used in the present invention.

Figure 17:
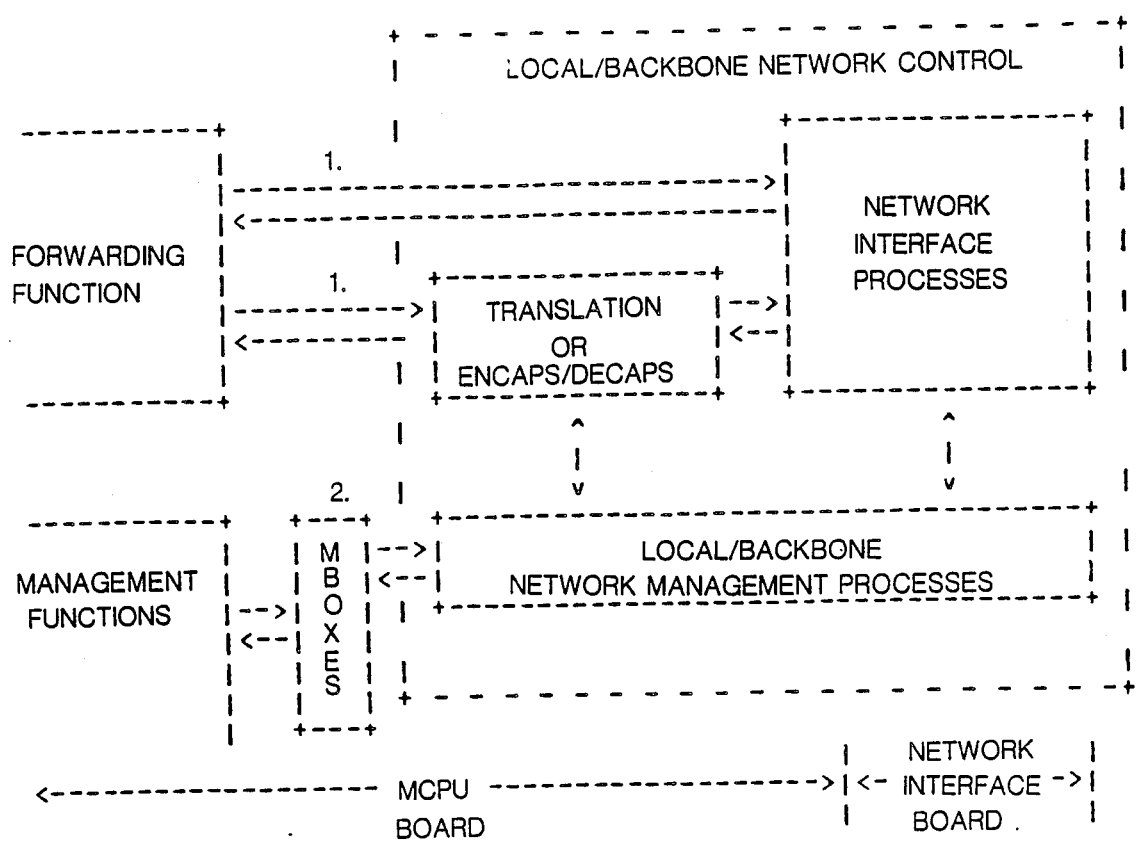

FIG. 17 illustrates the logical structure of a local or backbone network control component of the bridge shown in FIG. 12.

Figure 18:
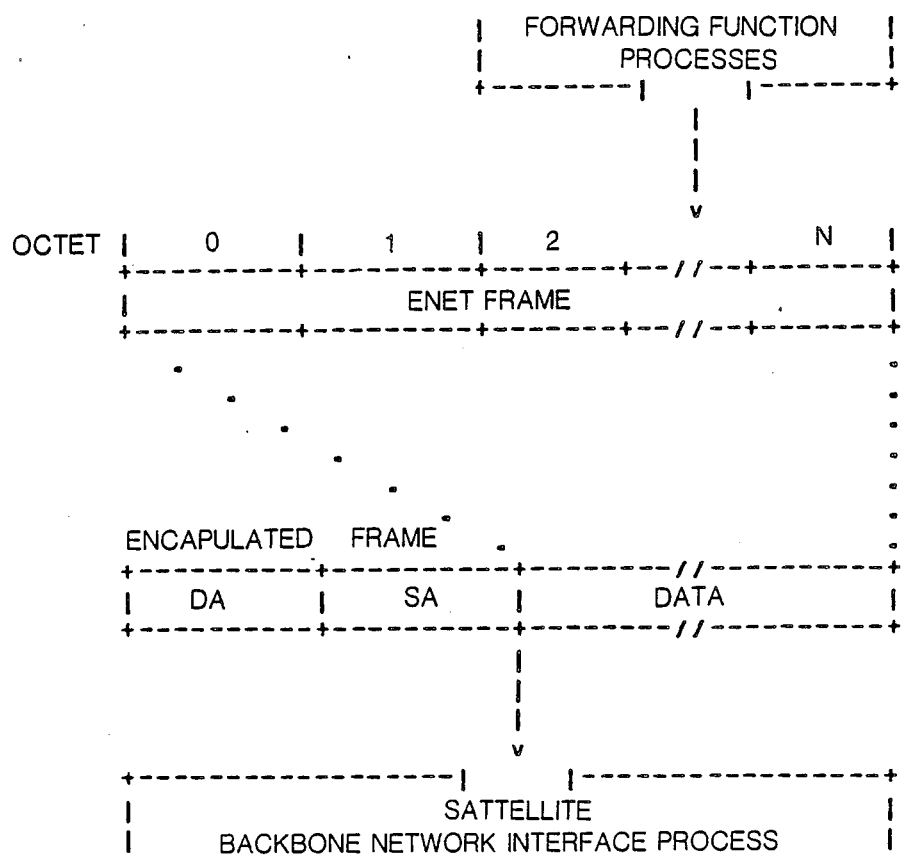

FIG. 18 illustrates how a frame is encapsulated in certain operations of the bridge illustrated in FIG. 12.

Figure 19:
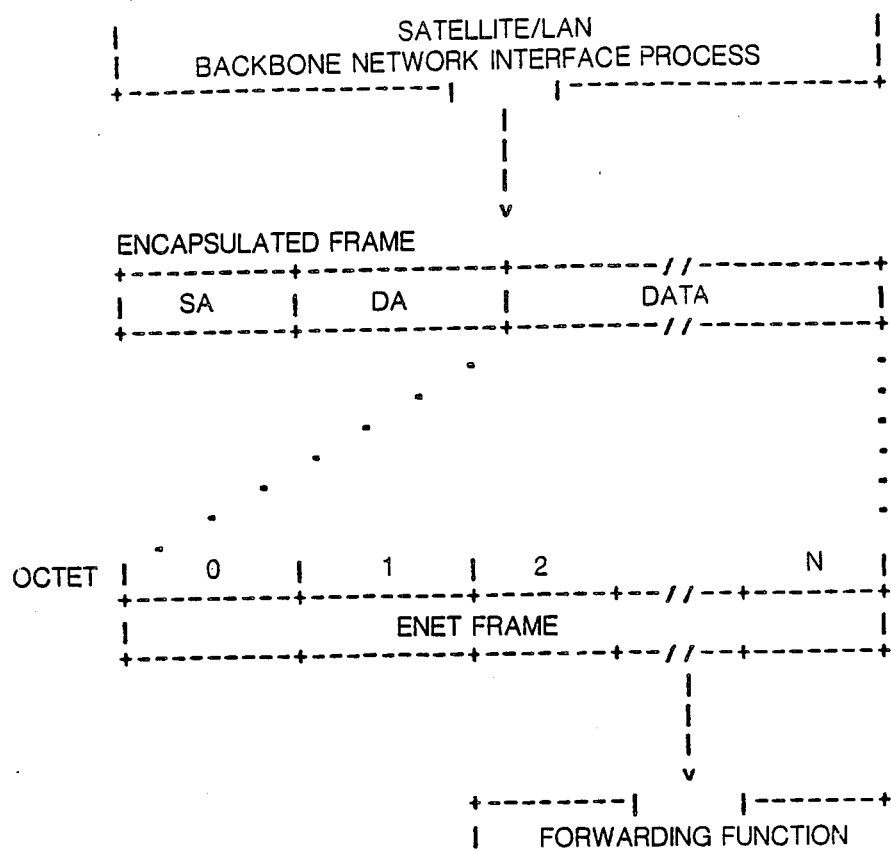

FIG. 19 illustrates how an encapsulated frame is decapsulated in the bridge illustrated in FIG. 12.

Figure 20:
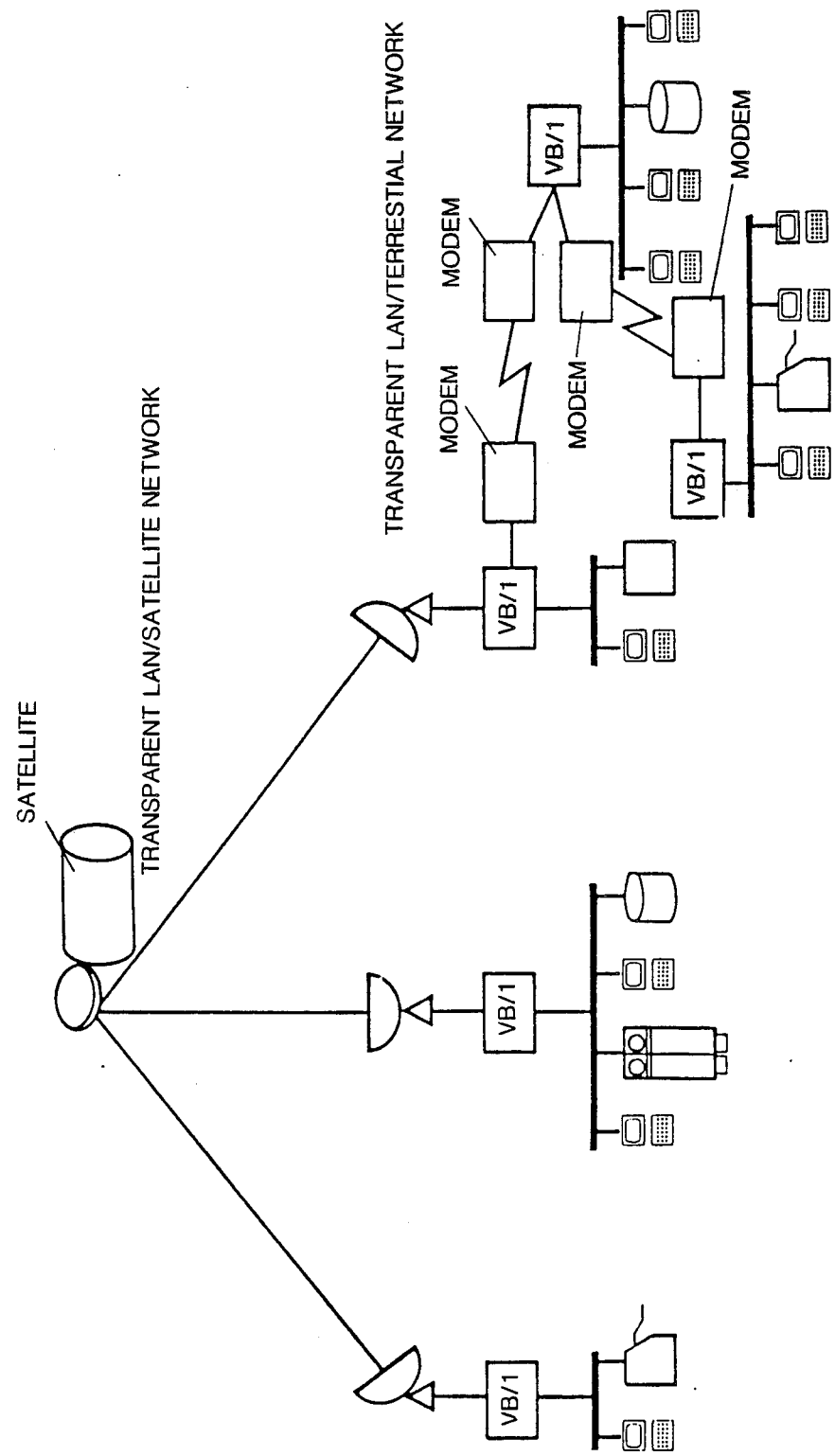

FIG. 20 is a pictorial view of a communications system for interconnecting Local Area Networks in accordance with one embodiment of the present invention.

DESCRIPTION OF THE PREFERRED EMBODIMENTS

In the text of this description the following references will be referred to by the abbreviations in the brackets as indicated.

[DEC84] Digital Equipment Corporation, Network and Communications Catalog, Summer, 1984

[DIX82] Digital, Intel, and Xerox, The Ethernet: A Local Area Network Data Link Layer and Physical Layer Specifications, Version 2.0, November, 1982

[Hawe84] Bill Hawe, Alan Kirby, and Bob Stewart, "Local Area Network Connection", Telecommunications, April, 1984

[IEEa83] IEEE Project 802 Local Area Network Standards, "IEEE Standard 802.3 CSMA/CO Access Method and Physical Layer Specifications", Approved Standard, July, 1983

[IEEb83] IEEE Project 802 Local Area Network Standards, "Draft IEEE Standard 802.4 Token Bus Access Method and Physical Layer Specifications", Working Draft E, July, 1983

[IEEc83] IEEE Project 802 Local Area Network Standards, "Draft IEEE Standard 802.5 Token Ring Access Method and Physical Layer Specifications", Working Draft, July 1983

[ISO33] ISO-3309, "HDLC, Frame Structure", available from Computer and Business Equipment Manufacturers Association, 1828 L St., N.W. Washington, DC, 20036

[Orns75] Severo M. Ornstein and David C. Walden, "The Evolution of a High Performance Modular Packet Switch", 1975 Internat. Conf. on Comm., San Francisco, CA, June, 1975

[Stew84] Bob Stewart, Bill Hawe, and Alan Kirby, "Local Area Network Interconnection", Telecommunications, Mar. 1984

Currently, Ethernet networks and/or 802.3 Local Area Networks(LAN's) are being installed in conjunction with a wide variety of office automation and data communication products. Once installed, many of these LAN's become the data highway for interconnecting multiple products which utilize various network architectures (e.g. TCP/IP, XNS, DECnet, etc.).

After one successful LAN installation, many organizations repeat the installation in multiple other locations. In many cases the need to link remote LAN's together is initially ignored. Later as organization begin to investigate their interconnect options, they discover that the simple multiple purpose data highway environment that exists within the building has disappeared.

The traditional Internet LAN interconnection techniques support a single architecture and consequently a subset of the current or potential LAN population. Also, since Internet processes in the LAN stations must assist in the interconnection, costly software upgrades may be required and complex multi-vendor compatibility problems can occur. Which architecture to interconnect becomes an issue. Redundant configurations for the different Internet protocols may be required. Some of LAN stations may not support an Internet implementation.

In contrast the TransLAN configuration and method of the present invention provide a simple and elegant LAN interconnect solution that transparently extends the public data highway paradigm to LAN interconnection. From the perspective of all LAN stations, the present invention turns on arbitrary number of Ethernet/802.3 LAN's into a single LAN. Using the ISO Reference Model, this description briefly describes the relationship of the present invention to other LAN interconnect devices. Next the simple architecture and operational characteristics of the present invention are defined. This is followed by a description of the flexibility of the present invention relative to satellite, terrestrial, and mixed configuration support, as well as its extensibility to 802.4 andother LAN's.

Relationship of the Present Invention to Other Products

An interconnection system and method constructed and operated in accordance with the present invention uses a device termed with Vitalink Bridge. Before discussing how the Vitalink Bridge operates, it is useful to understand its relationship to other LAN interconnect devices.

FIG. 1 illustrates a taxonomy for describing LAN interconnection [Stew84]. The taxonomy associates a LAN interconnection device with an ISO Reference Model layer. A device is associated with the layer in which it relays information from one network to another. The term network in this context ranges from LAN segments, satellite links, and terrestrial lines in the lower layers to network architectures (e.g. DECnet to SNA) in the higher layers.

In this taxonomy it is important to note that the layer performing the relay does not utilize information from the higher layers. In fact, differing higher layer protocols can (and do) concurrently utilize the same lower layer relay. Generally, the higher the relay layer, the more specialized are the set of products and protocols serviced by the relay. Also, factors such as overhead and complexity increase the higher the layer number.

The layer relays of direct interest to the present invention are Repeaters, Bridges, and Routers, layers 1-3 respectively. The most common of the three, Repeaters and Routers are briefly described and then compared and contrasted with Bridges.

REPEATERS: Physical Layer Relays

Repeaters relay physical layer protocol data units (bits) and control signals (e.g. collision detection). They operate at LAN speed and add only a very small amount of addition delay (e.g. less than 1 microsecond).

Repeaters are used to extend LAN configurations by connecting LAN channel segments together directly or across an internal point to point link. In general, the use of Repeaters in a LAN configuration is transparent to LAN station protocols.

However, the use of Repeaters as a general mechanism for interconnecting multiple LAN's is severely limited. The length of a single LAN (including any internal point to point links) is limited by Physical layer constraints such as maximum round trip propagation delay budget. This limits LAN expansion using Repeaters to a few kilometers. The maximum number of stations that can be effectively serviced by a single LAN is another limiting factor.

Since Repeaters relay bits, they are unable to selectively filter Data Link frames. Consequently, LAN expansion is restricted by maximum LAN capacity. Another consequence of the absence of filtering is that links used by repeaters to tie together two segments must operate at LAN speed.

An Ethernet Repeater [DIX82] is an example of a Repeater device.

ROUTERS: Network Layer Relays

Routers are the traditional LAN interconnect devices. When using these devices, LAN stations must be able to distinguish between communication with a station on the same LAN and a remote LAN. Remote communication requires LAN stations to transmit/receive Data Link frames to/from a Router on the same LAN.

The frames contain Internet protocol data units (packets) created by the LAN stations. Routers utilizes the Internet protocol control information in the packets and a local configuration topology table to determine how to relay a packets between the LAN and other networks. (e.g., point to point data links).

When compared to Repeaters, Routers are not transparent to LAN station protocols. They only work with LAN stations having a compatible Internet layer. Also, compared to Repeaters, Routers add significant delays. They operate as a store and forward packet relay (not a bit relay). Their internal processing time usually ranges from 5 to 50 milliseconds but more significant are the internal queue delays and transmission time between Routers.

Since LAN stations perform the filtering function for a Router (by only sending it packets destined for a remote LAN), the Router to Router links do not need to operate at LAN speeds. Typical link speeds range from 9.6 Kbps to 56 Kbps. Also, the maximum number of stations that can be effectively serviced by a single LAN is no longer a limiting factor. Stations can be spread amoung multiple interconnected LAN's.

A DECnet Router Server [DEC84] is an example of a Router device.

BRIDGES: Data Link Layer Relays

Bridges interconnect LAN's using the same media as Routers, but operate totally within the Datak Link layer. LAN's connected together by Bridges logically appear to the LAN stations as a single LAN.

LAN stations simply address Data Link frames to other stations as if they were on the same LAN. Broadcast and Multicast destination frames are handled properly. They are received by the addressed group of stations regardless of location. LAN stations do not address frames to Bridges as they must with Routers.

The Frame Check Sum value created by the source system is delivered to the destination station. Bridged LAN's have the same level of protection against corrupted data as is present on a single LAN. With Routers, the original FCS is removed by the first Router and recreated by the Last.

Like Routers, Bridges store and forward frames. This means, that unlike Repeaters, they are able to selectively filter and discard frames addressed to local stations. Bridges keep local traffic on one LAN from interfering with local traffic on the other LAN's. As a result, Bridge to Bridge links can operate at less than LAN speeds. In fact, in almost all configurations the same link speeds used to interconnect Routers can be used to interconnect Bridges.

Also, as with Routers, the maximum number of stations that can be effectively serviced by a single LAN is no longer a limiting factor. The stations can be spread amoung multiple bridged LAN's [Hawe84]. In contrast with Routers, since Bridges relay and filter for all LAN stations, they provide the more general solution for a congested LAN.

Since Bridges operate at a lower layer than Routers, they have less processing overhead and are capable of processing and relaying frames at higher rates (thousands of frames/second). Consequently, Bridges are capable of effectively utilizing high bandwidth links (1-10 megabits/sec) between LAN's.

When bridging remote LAN's together with a link operating at LAN speed or two local LAN's together directly, Bridges add a very small amount of additional delay (at most a few milliseconds). In contrast, when utilizing lower speed links, Bridges like Routers add significant delays due to transmission time. However, for the same configuration, the delay associated with a Bridge should be less than with a Router. This is due to the reduced processing overhead within a Bridge.

While conceptually a Data Link Bridge is not a new idea, recently the potential for these devices has greatly increased. Specifically, Digital Equipment Corporation was the first to recognize this new potential [Stew84]. The use of 48 bit global addressing in Ethernet and the 802 LAN's for the first time places a unique world wide identifier in the Data Link layer. Also, Bridges are processing and memory intensive devices that are able to exploit medium to high speed broadcast and point to point technologies. Significant cost reductions and technical advancements are occurring in all of these areas.

Operational Characteristics

Figure 2A:
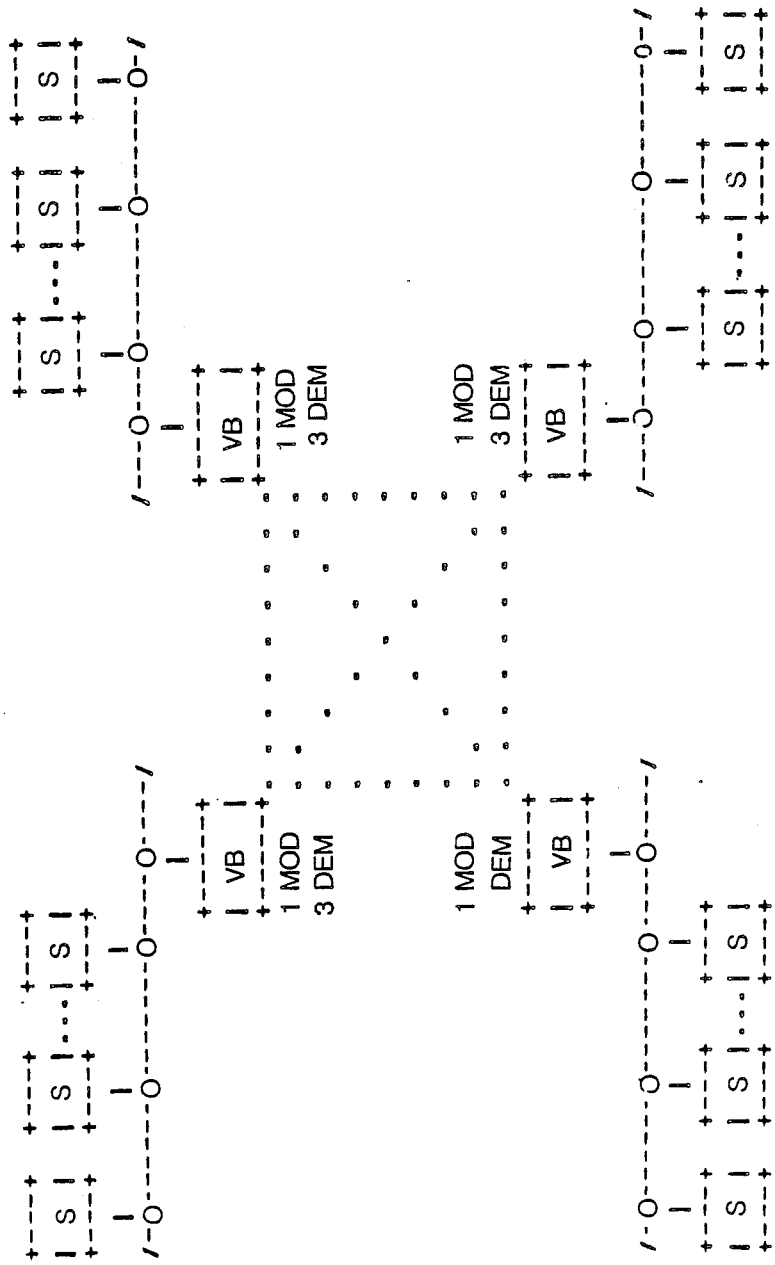
FIG. 2A is a view which corresponds to FIG. 2 but which shows the actual simplex channel configuration for a four node network.

To describe the operational characteristics of the present invention it is useful to first illustrate and discuss one configuration of the present invention. FIG. 2 illustrates four Ethernet [DIX82] and/or 802.3 [IEEa83]

LAN's bridged together across a satellite backbone network.

The backbone is operating in a fully connected broadcast mode such that any frame transmitted by one Vitalink Bridge (VB1, VB2, VB3 or VB4) is received by all other Bridges. Each Vitalink Bridge can be configured to Transmit at the same or a different rate.

A fully connected Vitalink satellite network is very similar to an Ethernet or 802.3 LAN. Both are a broadcast transmission media, support a promiscuous (receive all frames) reception mode, and have a very low bit error rate.

Both Ethernet and 802.3 utilize an unacknowledged datagram protocol. Likewise, the Vitalink Bridges utilize an unacknowledged datagram protocol across satellite backbone. The forwarded Ethernet/802.3 frames are simply enveloped inside the HDLC frame structure [ISO33]. In order to allow for concurrent support of Ethernet and 802.3 stations, the Vitalink Bridges support the 48 bit 802.3 Address Field.

A single Vitalink Bridge can concurrently relay between 2-9 different networks. For clarity and brevity, the following discussion configures each Vitalink Bridge with only two networks. This allows a simplified operational model to be utilized.

Listen—Only Mode

When Vitalink Bridge 1 in FIG. 2 is powered on it enters into LISTEN_ONLY mode. It remains in LISTEN_ONLY mode for 10-60 seconds. VB1 operates in Promiscuous mode relative to LAN I and the satellite backbone. As a result it receives all frames being transmitted by LAN stations A-C or Vitalink Bridges 2-4. No frames are relayed by VB1 during LISTEN_ONLY mode.

During LISTEN_ONLY mode, VB1 automatically creates a local data base (termed the Forwarding data store). A Forwarding data store entry is created from each frame received with a unique Source Address value. The entry contains the address and a local variable which identifies the source of the frame (LAN I or satellite backbone). A Vitalink Bridge can support a Forwarding data store of up to 8000 entries.

The following assumptions are made about the current activity within the FIG. 2 configuration. Stations (A,B), (M,N), (Q,R), and (X,Y) are only communicating locally on LAN I, II, III, and IV respectively. Stations (N,S), and (R,Z) are communicating with each other across the satellite backbone. Station C is turned off. As a result, the initial VB1 Forwarding data store (in summary form) contains the following entries.

Entry 1—address=A, source=LAN_I

Entry 2—address=B, source=LAN_I

Entry 3—address=N,
      source=SATELLITE_BACKBONE

Entry 4—address=S,
      source=SATELLITE_BACKBONE

Entry 5—address=R,
      source=SATELLITE_BACKBONE

Entry 6—address=Z,
      source=SATELLITE_BACKBONE

The entry source values of LAN_I or SATELLITE_BACKBONE are a locally assigned value. They are not globally administered or used as a global identifier between Vitalink Bridges in any manner.

Forwarding Mode

After the LISTEN_ONLY time period, the Vitalink Bridge enters FORWARDING mode. In FORWARDING mode the maintenance of the Forwarding data store based on Source Address continues in the background as defined above. Determining whether to filter (discard) or relay frames becomes the major foreground activity.

Relaying and Filtering Rules

When a single destination frame is received, a hash is created from the Ethernet/802.3 destination address. The hash is used to locate a matching Forwarding data store entry (in under 40 microseconds). If the matching entry's source value identifies the frames source network, the frame is discarded. Otherwise, the frame is relayed to the identified network. If no matching entry is located, the frame is relayed to all networks other than the source.

Since multicast or broadcast address values never appear as Source Addresses, Forwarding data store entries are not automatically created. As a result, multicast and broadcast frames are relayed like single destination frames with no matching entries. However, this can be changed by configuring broadcast and multicast entries into the Vitalink Bridges. When this is done, multicast and broacast destination frames are selectively filtered in the same manner as single destinaion frames.

Upon entering FORWARDING mode, VB1 in FIG. 2 begins relaying and filtering frames in the following manner.

(1) Frames received from LAN I destined for A or B are not relayed to the satellite network. (i.e., frames local to LAN I are filtered)

(2) Frames received from the satellite network destined for N, S, R, or Z are not relayed to LAN I. Frames destined for M, N, Q, X, and Y are not received on the satellite network because they are filtered locally by the associated Bridge. These stations are not communicating with remote LAN stations.

(3) Frames received from LAN I destined for L-Z are relayed to the satellite network.

(4) Frames received from the satellite network destined for A or B are relayed to LAN I.

Maintaining the Forwarding Data Store In FORWARDING mode Vitalink Bridges learn the location of new LAN stations very quickly. For example, assume that when station C is initialized, it generates an initial multicast frame containing a "Hello" or "Help" message. This is normal behavior for many just initialized LAN stations. VB1 relays the frame from LAN I to the satellite backbone and creates the following Forwarding data store entry:

Entry—address=C, source=LAN_I

VB2-4 receive the "Hello or Help" frame on the satellite backbone and relay the frame to LAN's II-IV respectively. In addition, they each create the following Forwarding data store entry:

Entry—address=C,
      source=SATELLITE_BACKBONE

As a result, the "Hello" or "Help" message is received by all addressed LAN stations. Also, all Vitalink Bridges learn the relative location of station C and are able to appropriately filter and relay frames destined to it.

If a Vitalink Bridge does not receive a frame containing a particular destination or source address value for about 15 minutes, the associated Forwarding data store entry is considered stale. Stale entries are automatically deleted. If station A in FIG. 2 moves to LAN II, the Vitalink Bridges will forget A's association with LAN I independent of any action by station A.

If station A in less than 15 minutes moves and generates, for example, a "Hello" or "Help" multicast frame on LAN II, the VB1 and VB2 entries change as follows:

VB1 Entry—address=A,
source=SATELLITE_BACKBONE (was LAN I)

VB2 Entry—address=A, source=LAN_II (was SATELLITE BACKBONE)

The source value in the VB3 and VB4 entries remains equal to SATELLITE BACKBONE. Relative to VB3 and VB4, station A did not change position.

Experience has shown that the "no matching entry" case for single destination frames is rare. When it does occur, it usually occurs for one frame and NEVER results in a Vitalink Bridge forwarding error. The frames always reach the addressed destination.

Expanding the Configuration

Expanding a TransLAN configuration of the present invention is extremely easy. For example, the FIG. 2 configuration can be expanded as illustrated in FIG. 3. The addition of VB5 and VB6 results in VB1-4 learning about more stations. For example, if station D generates a single destination frame to station Z, the following following entries are created:

VB6 Entry—address=D, source=LAN_V

VB5 Entry—address=D,
source=TERRESTRIAL_LINK

VB4 Entry—address=D, source=LAN_IV

Since VB4 does not relay the frame to the Satellite Backbone (the VB4 Entry for station Z has a source value of LAN IV), VB1-3 do not create entries. Subsequently, if D generates a single destination frame to station A, VB4 will relay the frame and VB1-3 will then create the following entries:

VB3 Entry—address=D,
source=SATELLITE_BACKBONE

VB2 Entry—address=D,
source=SATELLITE_BACKBONE

VB1 Entry—address=D,
source=SATELLITE_BACKBONE

If station E initializes and generates a "Hello" multicast frame, VB1-6 create the following entries:

VB6 Entry—address=E, source=LAN_V

VB5 Entry—address=E, source=TERRESTRIAL LINK

VB4 Entry—address=E, source=LAN_IV

VB3 Entry—address=E,
source=SATELLITE_BACKBONE

VB2 Entry—address=E,
source=SATELLITE_BACKBONE

VB1 Entry—address=E,
source=SATELLITE_BACKBONE

The Vitalink Bridges automatically adapt to the new configuration. The addition of VB5 and VB6, a terrestrial link, and LAN V requires no configuration changes to existing Bridges. The new and existing Bridges simply learn the relative location of new stations.

Supported Topologies

The configuration illustrated above indicates that the Vitalink Bridge supports interfaces to both a broadcast satellite network and a point to point data link. The present invention is also capable of supporting other point to point and broadcast media such as terrestrial microwave.

Both broadcast and point to point interconnect media are supported by the system and method of the present invention in a number of ways.

Dual Bridge Topologies

Two Vitalink Bridges can be interconnected using either a broadcast medium or a point to point medium (e.g., terrestrial data link). A broadcast and point to point dual end point configuration is illustrated in FIG. 4. In both configurations, VB1 and VB2 are connected to a LAN.

When utilizing a broadcast medium, VB1 or VB2 relay frames destined to remote LAN stations onto a simplex broadcast channel. They each receive the other Bridges transmit channel. When utilizing the point to point medium, VB1 and VB2 each transmit on one side of the duplex data link and receive from the other.

Relative to both the broadcast and point to point configurations, frames transmitted by one Bridge are almost always relayed and not filtered by the other Bridge. This occurs because each Bridge normally filters frames received from its LAN that are destined for local stations. As a result, only frames destined for stations on the other LAN are transmitted.

Typically, a point to point medium (terrestrial line), provides the same transmit rate in both directions. In contrast, the concept of broadcast simplex channels encourages the use of different transmit rates to cost effectively accommodate asymmetric data transmission requirements. For example, if most of the traffic is LAN I stations transferring files to LAN II stations, the present invention allows the transmit rate of the VB attached to LAN I to be much higher.

Star Topology

The system and method of the present invention can interconnect more than two Vitalink Bridges using a star topology. The medium used to interconnect the star can be broadcast or point to point. See FIG. 5. In both cases, the present invention automatically relays and filters frames as appropriate. Support of the broadcast and point to point medium is summarized below using the configurations illustrated in FIG. 3. In both of the configurations, VB1 through VBN are each connected to LAN.

Broadcast Star Topology

In broadcast star topology each Vitalink Bridge has a simplex transmit channel. VB1's simplex channel is received by all remote VB's. Each remote VB's transmit channel is only received by VB1. This allows numerous remote LAN stations to statistically share a high speed VB1 transmit channel. The VB2-N transmit channels can be low speed in comparison.

In configurations where a large percentage of the data is transferred from a central site to remote locations, the broadcast star topology is particularly effective. In addition, TransLAN maintains full connectivity. (e.g., VB2 LAN stations can send frames to both VB1 as well as VB3-N LAN stations).

Point to Point Star Topology

The point to point star topology is interconnected by individual duplexed data links. One end of each link is attached to VB1; the other end of each link is attached to one remote VB. Each link can have a different transmit rate; but, the VB1 and the remote VB transmit rates are always equal for a given line.

As with the broadcast star topology, TransLAN maintains full connectivity. VB2-N LAN stations can send frames to VB1 LAN stations and VB1 will appropriately switch frames between VB2-N LAN stations.

Fully Connected Topology

FIG. 2 illustrates a configuration of the present invention that interconnects Vitalink Bridges using a fully connected broadcast topology. A fully connected topology is characterized by each VB being directly connected to all other VB's.

The use of simplex channels in accordance with the present invention to support a fully connected topology is illustrated in FIG. 6. Each Vitalink Bridge has a transmit channel that is received by all other Bridges. To fully connect the set of N LAN's using a broadcast topology requires N simplex links.

To fully connect a set of N LAN's using point to point medium requires $N(N-1)/2$ links. If N equals 3, 4, 8, or 16, the number of links equals 3, 6, 28, or 120 respectively. The number of broadcast simplex channels required for the same N values is 3, 4, 8, or 16 respectively.

A fully connected broadcast topology is chosen over a star topology when the flow of information between the remote sites is balanced, not predominantly to and from a single central site. This does not imply that the transmit rate of each Bridge must be the same. In fact, in a fully connected topology the present invention allows each Bridge to have the same or a different rate.

Mixed Topologies

The ease of mixing a fully connected topology and a point to point link has already been illustrated in FIG. 3 and discussed. The simple rule is that the present invention is capable of mixing any supported topology within a configuration. The only restriction is that the topologies cannot be configured together in such a way as to form a loop.

FIG. 7 illustrates a configuration containing two star topologies connected to a LAN in the central site. The star topologies and the LAN are labeled in FIG. 7 for the convenience of this discussion. There are no corresponding global identifiers in the actual implementation of the present invention.

The topology of Star 1 and Star 2 can be both broadcast or point to point, or one broadcast and one point to point. The remote sites each have a LAN and a Vitalink Bridge. Any remote site is directly connected (one hop) to the central site and two hops away from any other remote site.

As discussed earlier, a frame transmitted between remote sites on the same star is relayed by the associated central site Bridge. The frame is not transferred to LAN I. A frame transferred between a Star 1 remote site and a Star 2 remote site is relayed between VB1 and VB2 across LAN I. Normally, relaying a frame across LAN I will add only a few additional milliseconds.

It is interesting to note the extent to which each bridge understands the FIG. 7 configuration. Both VB1 and VB2 think they are relaying and filtering for LAN I and functioning as the center of Star 1 and 2 respectively. Each Star 1 and Star 2 remote VB in turn thinks that it is relaying and filtering for its local LAN and functioning as a remote Bridge in a single star. The point is that A vitalink bridge does not require knowledge of the entire configuration. To function correctly, a vitalink bridge only needs to understand its role in networks to which it directly interfaces.

It is this characteristic that allows configurations to be so easily expanded. For example, the FIG. 7 configuration can be expanded as illustrated in FIG. 8. In the expanded configuration, the following occurs:

(1) the perspective of all Star 1 and Star 2 Vitalink Bridges does not change (stays the same as in the FIG. 7 configuration).
(2) The VB3 and the Star 3 remote VB's have the same relative perspective as either of the respective Star 1 and 2 Bridges.
(3) VB4 is only aware of relaying and filtering for LAN II and the fully connected broadcast network.
(4) VB5 is only aware of relaying and filtering for a LAN I, the fully connected broadcast network, and the point to point link. VB5 is another example of a Vitalink Bridge interfacing to more than two networks.
(5) VB6 is only aware of relaying and filtering for LAN III and the point to point data link.

While the perspective of VB1-VB6 in the FIG. 8 configuration is greatly simplified, the LAN stations have by far the simplest perspective. (see FIG. 9). The overall configuration is viewed by all LAN stations as containing a single LAN. When transmitting frames, stations always assume the destination is on the same LAN. This is true for both single destination and multicast destination frames.

Network Management (Bridge Manager)

FIG. 9 illustrates the transparency of the configuration of the present invention. However, providing this transparency elevates the need for distributed network management visibility and control.

Fortunately, network management communication to and from Bridges can exploit the simplicity of the single LAN perspective. Each Vitalink Bridge automatically creates the following permanent Forwarding data store entry.

```
Entry—address=LOCAL_BRIDGE,
    source=SELF
```

When a frame with the LOCAL_BRIDGE Destination address is received, it is passed to the local Bridge management process and not relayed. Entries are also created for certain Bridge multicast address values.

Entry—address=BRIDGE_MULTICAST_1, source=SELF

Entry—address=BRIDGE_MULTICAST_2, source=SELF

When a frame with a BRIDGE_MULTICAST destination address is received, it is copied for the local Bridge management process and then relayed.

To communicate with a Vitalink Bridge anywhere in a configuration of the present invention, a LAN station only needs to generate a frame with Bridge single destination or multicast destination address. The frame will be received and processed by the Vitalink Bridge(s) with a matching entry.

A Bridge management process simply generates single destination and multicast frames. Except during LISTEN_ONLY mode, a Vitalink Bridge treats the local Bridge management process like another network. A frame generated by the local bridge management process is relayed or filtered in the same manner as a frame received from a network.

During LISTEN_ONLY mode, Bridge management frames are relayed to and from the local Bridge management process. All other frames received during LISTEN_ONLY mode are filtered.

One use of this capability is for Loop detection. During LISTEN_ONLY mode a Bridge transmits LOOP_DETECTION multicast frames. If a LOOP_DETECTION frame is received with a source address equal to the LOCAL_BRIDGE address, the bridge does not enter FORWARDING mode. If it did, a loop would be created.

Each Vitalink Bridge maintains an extensive set of statistical and local configuration information. The local Bridge management process provides an information access service. The service supports information retrieval and online reconfiguration. This service can be accessed by both network operators and peer management processes.

Network Operator Communication

Network operators can access a Vitalink Bridge from one or more remote locations using terminals attached to system Management stations. The Management station communication with a Bridge uses a Virtual terminal protocol.

A operator can establish up to 4 concurrent connections to different Bridges from the same terminal. This allows an operator to concurrently view the perspective of several Bridges. Optionally, an operator can access a Bridge through its local console. The operator interface from the console and terminal are the same.

Multiple Bridge consoles, and terminals (or printers) can be configured to receive alarms and statistical messages. Each may receive all or a subset.

Peer Process Communication

A Vitalink Bridge supports a simple request/response protocol layered directly on top of either Ethernet or 802.3. When a request is received within an Ethernet or 802.3 frame, a Bridge transmits the associated response using the same type of frame. The destination address in the response frame equals the source address value received in the request frame.

The request/response protocol provides the mechanism through which both Ethernet and 802.3 stations can communicate with a Bridge. The protocol provides access to essentially the same information that is available to a network operator.

Beyond Ethernet and 802.3

The system of the present invention expects the following from a LAN. A promiscuous receive mode is supported. All frames sent and received from a LAN contain a 48 bit destination and 48 bit source address. Frames contain a 32 bit Frame Check Sequence and have a length between 64 and 1518 octets. A single class of service is provided to the LAN stations. LAN's which are compatible with these assumptions are termed compatible with the system of the present invention.

System Compatible LANs

The development effort to support a LAN compatible with the system of the present invention ranges from no effort to developing a new LAN interface. For example, changing the medium to broadband or fiber optics, only requires a different transceiver. Depending upon the implementation, the impact of changing LAN speeds from 10 megabits to one megabit ranges from a configuration change to developing a new LAN interface. The list of "TransLAN system compatible" LAN's includes the other potential IEEE 802.3 standards, Cheapernet and AT&T's S LAN.

Adding a "TransLAN system compatible" LAN to a TransLAN configuration of the present invention is no different than adding an Ethernet or 802.3 LAN to the configuration. Only the Vitalink Bridge interfacing to the LAN is aware of the LAN's existence. The LAN stations still have a single LAN perspective.

Almost TransLAN System Compatible

A LAN is considered "almost TransLAN system compatible" when a simple protocol translation at the LAN interface makes the LAN appear "TransLAN system compatible" to the rest of the configuration. The other Bridges are unaware of the LAN's true properties.

For example, IEEE 802.4 [IEEEb83] is an "almost TransLAN system compatible" LAN. 802.4 supports a maximum frame size that is larger than 1518 octets and offers multiple classes of service. Concurrent system support of 802.3 and 802.4 can be accomplished by limiting the frames on the 802.4 LAN(s) to 1518 octets and providing a translation function directly on top of the 802.4 LAN interface.

In each Bridge interfacing to an 802.4 LAN, the translation function does the following:
(1) removes the class of service in received 802.4 frames.
(2) adds preconfigured class of service information to transmitted 802.4 frames. Bridges can be configured to all insert the same class of service or to each insert different classes as appropriate.

Bridging together "TransLAN system compatible" LAN's with "almost TransLAN system compatible" LAN's has an interesting effect. The single LAN perspective by the LAN stations is preserved, but each LAN station thinks the single LAN is of the type to which it interfaces. For example, 802.3 stations view the configuration as an 802.3 LAN, and 802.4 stations view it as an 802.4 LAN. Also, 802.3 and 802.4 stations can exchange frames.

Not TransLAN System Compatible

A LAN is considered "not TransLAN system compatible" when a simple protocol translation at the LAN interface is not possible. In this case the LAN frames can be encapsulated inside a system compatible frame and sent across a system configuration to a destination Bridge. The destination Bridge decapsulates the frame and relays the frame back to its native LAN environment.

This technique allows LAN's which are "not TransLAN system compatible" to share the interconnection capabilities of the present invention. Frames from the group of incompatible LAN's are essentially "tunneled" through the configuration and method of the present invention.

Support of a group of LAN's which are "not TransLAN system compatible", results in two separate single LAN perspectives. As expected, all of the stations attached to LAN's within the configuration have the same single LAN perspective. Their perspective is unchanged by the presence of the "not TransLAN system compatible" LAN's. Concurrently, all of the stations attached to the "not TransLAN system compatible" LAN's have a different, not overlapping, single LAN perspective.

Partial Summary of the Description Above

Vitalink Bridges have the transparency of repeaters, but are able to selectively filter and relay by automatically learning the relative location of stations. The Bridges are able to support a wide variety of point to point and broadcast topologies. Because Vitalink Bridges are essentially transaprent to each other, configurations of the present invention can be easily expanded to support a very large number of LAN's.

Bridges perform a Data Link layer relay. Consequently, they can interconnect all LAN stations independent of their higher layer architecture. Interconnected LAN stations view any configuration of the present invention as a single logical LAN.

Due to the high degree of transparency, emphasis is placed by the system and method of the present invention on network management visibility and control. Fortunately, accessing Bridges is easy; they all appear to be on the local LAN.

The present invention bridges together Ethernet and/or 802.3 LAN's. Supporting other LAN's is, in many cases, straight forward. This allows the free use of different LAN technologies, while preserving the ease of communication on a single LAN.

Bridges are simple and elegant devices that provide a new general purpose networking glue. While the work with this glue is just beginning, its effect is expected to be significant.

FURTHER AND MORE SPECIFIC DESCRIPTION OF THE TECHNICAL BACKGROUND OF THE PREFERRED EMBODIMENTS (AND IN PARTICULAR THE BRIDGE)

In the following text the following references will be referred to by the numerical codes as indicated to the left of the references.

2.2—The Ethernet, A Local Area Network Data Link Layer and Physical Layer Specifications, Version 2.0, November 1982.
2.3—IEEE Project 802, Local Area Network Standards, IEEE Computer Society, July 1983.
2.4—Ethernet System Product Line Software Technical Reference Manual, Preliminary Draft, May 1983, Bridge Communications Inc.
2.5—ESPL Software Technical Reference Manual, Volume One, July 1983, Bridge Communication Inc.
2.6—ESPL Software Technical Reference Manual, Volume Two, July 1983, Bridge Communication Inc.
2.7—ESPL Software Technical Reference Manual, Volume Three, July 1983, Bridge Communication Inc.

This description describes the high level design of the bridge of the present invention. Sometimes the present invention is referred to as the Vitalink Bridge or the Bridge.

3.1—Networks

The reader should understand the following Vitalink Bridge concepts concerning networks:
 (a) Network IDs
   Relative to a Vitalink Bridge, a Network contains a single Transmit (or output) access point and one or more Receive (or input) access points. In some cases the Transmit and Receive access points utilize a common I/O port (e.g. Ethernet) and in other cases the they utilize different I/O ports (e.g. FDMA Transmit and Receive frequencies).
   Each Transmit and Receive access point is assigned a local identifier termed a Network ID (NID). The the minimum number of NID's associated with a network is two (i.e., one for Transmit, a TNID and one for Receive, a RNID). However, in certain cases (defined later), a TNID or RNID will be associated with a PSEUDO (non existent) Transmit or Receive access point.
 (b) Local Network
   A network that contains a station that is either the source or destination for a frame that is transmitted on the Extended Network. The network is considered a local network relative to that frame.
 (c) Backbone Network
   A network across which a frame on the the Extended Network is transmitted but does not contain either the source or destination station for the frame. The network is considered a backbone network relative to that frame.

3.2—Extended Network(ENET) Frame

The Vitalink Bridge Design assumes that the "standard" Extended Network(ENET) frame that either all Local Networks utilize, or that their Bridge translates or encapsulates/decapsulates to/from before forwarding. The Vitalink design requires an ENET frame to conform to the Ethernet/802.3 Frame Size Limitations and contain the following Ethernet/802 Protocol Information.
 (a) 48 Bit Destination GLOBAL_ADDRESS
 (b) 48 Bit Source GLOBAL_ADDRESS 3.3—Satellite Backbone Physical Topologies Vitalink Bridges collectively support the following Physical Satellite Backbone Topologies.
 (a) NON_ROOTED Network (also referred to as full mesh and fully connected)

This is the simplest type of Backbone Network. A NON_ROOTED network has the same topology as an Ethernet or a point to point terrestrial link. In this topology, each Vitalink Bridge is classified as a BRANCH and is configured as follows:
(1) has a single Transmit Frequency that is received by the other BRANCH(es). A BRANCH classifies its Transmit frequency as NON-ROOTED
(2) only receives Transmit frequencies from Vitalink Bridges that receive it's Transmit frequency.

(b) SINGLE_ROOTED Network (also referred to as star)
In this topology, a Vitalink Bridge is classified as either a BRANCH or a ROOT.
(1) Each BRANCH has a single Transmit Frequency that is classified as ROOTED_BRANCH and is only received by the ROOT.
(2) The ROOT has a single Transmit Frequency that is classified as ROOT and is received by all BRANCHes.
A SINGLE_ROOTED topology must contain multiple BRANCHes. (i.e., Otherwise, it is NON_ROOTED)

(c) MULTI_ROOTED Network (also referred to as multi-star)
This is the most complex topology a Vitalink Bridge supports. In this topology, a Vitalink Bridge is classified as a BRANCH, a ROOT, or a SECONDARY_ROOT.
(1) Each BRANCH has a single Transmit Frequency that is classified as ROOTED_BRANCH and is received by all ROOT's.
(2) Each ROOT has a single Transmit Frequency that is received by all BRANCHes and other ROOT(s). One ROOT classifies its Transmit frequency as ROOT. All other ROOT(s) classify their Transmit frequency as SECONDARY_ROOT
A MULTI_ROOTED topology must contain one or more BRANCHes. (i.e., Otherwise, it is NON_ROOTED)

(d) Multiple Topology Support
A Vitalink Bridge can concurrently interface to multiple topologies with the following restrictions:
(1) each topology has its own Transmit/Receive frequencies
(2) a multi bridge configuration (defined later in the document) support only 1 Satellite Backbone
Multiple Satellite Backbones of any topology can always be supported at a location by multiple Vitalink Bridges connected to a common LAN.

3.4—SINGLE_ROOTED Encapsulation/Decapsulation

The Logical Topology of an ENET is defined to be a Branching Tree with no alternate paths that create loops. In order to preserve the ENET logical topology, Vitalink Bridges operate as follows when utilizing Transmit and Receive frequencies associated with a SINGLE_ROOTED Satellite Network.
(a) A BRANCH always encapsulates frames to be transmitted on a ROOTED_BRANCH frequency. The frames are encapsulated within an ENET Frame with a maximum size of 1530. The GLOBAL_ADDRESS values of the encapsulated frame are
(1) The Destination Address=BRANCH_ENCAPSULATION (BE) Vitalink multicast address.
(2) The Source Address=GLOBAL_ADDRESS of the BRANCH
(b) In order to allow BRANCHes to operate in the ENET, the ROOT decapsulates received BE frames. The ROOT then forwards to the associated ROOTED Transmit frequency, the decapsulated BE frames that are either
(1) destined for a station know to be accessible through the Transmit frequency (from a Forwarding data store entry)
(2) have an unknown destination.
The forwarding of these frames back to the SINGLE_ROOTED Satellite Backbone is termed DOUBLE_HOPPING.
(c) The ROOT always encapsulates a DOUBLE_HOPPED frame within an ENET Frame with a maximum size of 1530. The GLOBAL_ADDRESS values of the encapsulated frame are
(1) The Destination Address=ROOT_ENCAPSULATION (RE) Vitalink multicast address.
(2) The Source Address=Source Address of the BE frame (i.e. the GLOBAL_ADDRESS of the BRANCH that created the BE)
(d) each BRANCH processes received RE frames as follows:
(1) all RE frames with a Source Address equal to the BRANCH GLOBAL_ADDRESS are discarded.
(2) all other RE frames are decapsulated and processed like any other received ENET frame.
(e) The ROOT does not encapsulate NON_DOUBLE_HOPPED frames forwarded to the Satellite Backbone.
(f) BRANCHes process received non encapsulated ENET frames.
(g) To preserve compatability with support of a MULTI_ROOTED topology, the ROOT also processes received non encapsulated ENET frames.

3.5—MULTI_ROOTED Encapsulation/Decapsulation

As in 3.5 above, in order to preserve the ENET logical topology, Vitalink Bridges operate as follows when utilizing Transmit and Receive frequencies associated with a MULTI_ROOTED Satellite Network.
(a) A BRANCH always encapsulates frames to be transmitted on a ROOTED_BRANCH frequency within a BE Frame (same as SINGLE_ROOTED)
(b) In order to allow BRANCHes to operate in the ENET, all ROOTs decapsulate the received BE frames. SECONDARY_ROOT(s) decapsulate received BE frames, and process as a normal ENET frame. The ROOT decapsulates received BE frames and then forwards to the associated ROOT Transmit frequency, the decapsulated BE frames that are either
(1) destined for a station know to be accessible through the Transmit frequency (from a Forwarding data store entry)
(2) have an unknown destination.

The forwarding of these frames back to the MULTI_ROOTED Satellite Backbone is termed DOUBLE_HOPPING.

(c) The ROOT always encapsulates a DOUBLE_HOPPED frame within an ENET Frame with a maximum size of 1530. The GLOBAL_ADDRESS values of the encapsulated frame are
  (1) The Destination Address=ROOT_ENCAPSULATION (RE) Vitalink multicast address.
  (2) The Source Address=Source Address of the BE frame (i.e. the GLOBAL_ADDRESS of the BRANCH that created the BE)

(d) Each BRANCH processes received RE as in the SINGLE_ROOTED case above. The SECONDARY_ROOT(s) discard received RE frames.

(e) The ROOT does not encapsulate NON_DOUBLE_HOPPED frames forwarded to the Satellite Backbone. SECONDARY_ROOT's never encapsulate frames forwarded to the Satellite Backbone.

(f) BRANCHes, ROOTs and, SECONDARY_ROOT's process received non encapsulated ENET frames.

3.6—Ku Band Rain and NON_ROOTED Satellite Backbone

A NON_ROOTED Ku Band Satellite Backbone can operate on a sunny day in its normal no DOUBLE_HOP mode. However, rain has a disruptive effect on Ku band transmissions. Therefore, when a NON_ROOTED BRANCH is in the rain, it and the other NON_ROOTED BRANCHes operate as follows:

(a) The BRANCH in the rain is termed a RAIN_BRANCH. The RAIN_BRANCH reconfigures its Transmit access point to be RAIN_ROOTED (the Transmit power is also increased)

(b) A RAIN_BRANCH always encapsulates frames to be transmitted on a RAIN_ROOTED Transmit access point within a RAIN_BRANCH_ENCAPSULATION (RBE) Frame. with a maximum size of 1530. The GLOBAL_ADDRESS values of the encapsulated frame are
  (1) The Destination Address=RAIN_BRANCH_ENCAPSULATION (RBE) Vitalink multicast address.
  (2) The Source Address=GLOBAL_ADDRESS of the BRANCH (c) Another BRANCH with a large dish is always configured as a RAIN_ROOT and its Transmit access point is configured as RAIN_ROOT.

(d) In order to allow the RAIN_BRANCH(es) to operate in the ENET, when the first RBE frame is received, the RAIN_ROOT marks the Receive access point as RAIN. A RAIN_ROOT always decapsulates a RBE frame. The RAIN_ROOT forwards to the associated RAIN_ROOT Transmit access point, a decapsulated RBE frame that is either:
  (1) destined for a station know to be accessible through the RAIN_ROOT Transmit access point (from an FDSE)
  (2) has an unknown destination.

The forwarding of these frames back to the RAIN_ROOT Transmit access point is termed DOUBLE_HOPPING. (the RAIN_ROOT Transmit power is also increased)

(e) When a non encapsulated ENET frame is received from the RAIN_ROOTED Satellite Backbone, it is DOUBLED HOPPED by the RAIN_ROOT when either:
  (1) it is destined for a station whose Receive RNID is marked RAIN and is known to be accessible through the RAIN_ROOT Transmit access point (from an FDSE)
  (2) has an unknown or multicast/broadcast destination.

(f) The RAIN_ROOT always encapsulates a DOUBLE_HOPPED frame within an ENET Frame with a maximum size of 1530. The GLOBAL_ADDRESS values of the encapsulated frame are
  (1) The Multicast Address=RAIN_ROOT_ENCAPSULATION (RRE) when there is a matching FDSE or RAIN_ROOT_DOUBLE_HOPPED_UNKNOWN (RRDU).
  (2) The Source Address=Source Address of the decapsulated BE frame (i.e. the GLOBAL_ADDRESS of the BRANCH that created the BE) or the RAIN_ROOT GLOBAL_ADDRESS (g) When a non encapsulated ENET frame is received from a Receive access point associated with another network, it is encapsulated by the RAIN_ROOT and transmitted on the RAIN_ROOT Transmit access point when either:
  (1) it is destined for a station whose Receive RNID is marked RAIN and is known to be accessible through the RAIN_ROOT Transmit access point (from an FDSE)
  (2) has an unknown or multicast/broadcast destination These frames are termed NON_DOUBLE_HOPPED encapsulated frames.

(h) The RAIN_ROOT always encapsulates a NON_DOUBLE_HOPPED frame within an ENET Frame with a maximum size of 1530. The GLOBAL_ADDRESS values of the encapsulated frame are
  (1) The Multicast Address=RAIN_ROOT_ENCAPSULATION (RRE) when there is a matching FDSE or RAIN_ROOT_UNKNOWN (RRU).
  (2) The Source Address=the RAIN_ROOT GLOBAL_ADDRESS (i) BRANCHes and RAIN_BRANCHes discard received RBE frames.

(j) RAIN_BRANCHes discard received non_encapsulated frames.

(k) RAIN_BRANCHes process received RRE frames as follows:
  (1) all RRE frames with a Source Address equal to the RAIN_BRANCH GLOBAL_ADDRESS are discarded.
  (2) all other RRE frames are decapsulated and processed.

(l) RAIN_BRANCHes decapsulate and process received RRDU and RRU frames (m) BRANCHes process received RRE frames as follows:
  (1) all RRE frames with a Source Address equal to the BRANCH GLOBAL_ADDRESS are discarded. (this is necessary because the BRANCH may have just transitioned from a RAIN_BRANCH)
  (2) all other RRE frames are decapsulated and processed.

(n) BRANCHes discard RRDU but decapsulate and process received RRU frames (o) When the rain stops, reversing the above requires the following:
  (1) The RAIN_BRANCH to reconfigure its Transmit access point to NON_ROOTED and become a BRANCH.
  (2) when the first non encapsulated frame is received, the RAIN_ROOT changes the Receive access point to NO_RAIN.

3.7—Ku Band Rain and ROOTED Satellite Backbones

This design assumes that the ROOT in a SINGLE_ROOTED Ku band network has a large dish. It likewise assumes that the ROOT with the MULTI_ROOTED Transmit frequency in a MULTI_ROOTED Ku band network has a large dish. These large dish ROOTs are termed DOUBLE_HOP ROOTs.

Since a ROOTED Ku Band Satellite Backbone operates on a sunny day in DOUBLE_HOP mode, rain does not require reconfiguration. The BRANCH(es) and ROOT(s) operate as normal except that
  (a) The RAIN_BRANCH increases its Transmit power.
  (b) The DOUBLE_HOP ROOT increases its Transmit power.

3.8—Ku Band Rain Alternative

As defined below an alternative method of dealing with Ku band Rain is to reconfigure the RAIN_BRANCH to and from a temporary SINGLE_ROOT network. This method requires extensive coordination by BRANCH and ROOT Management Function processing and protocols. Consequently, this method will not be implemented initially (if ever?)
  (a) A temporary SINGLE_ROOTED network is configured from part of a NON_ROOTED Network as follows:
    (1) The RAIN_BRANCH DISABLES its normal Receive frequencies, ENABLES a RAIN_ROOT Receive frequency, and increases Transmit power. A network is configured from the ROOTED Transmit frequency and RAIN_ROOT Receive frequency.
    (2) The other BRANCH(es) DISABLE their RAIN_BRANCH Receive frequency and ENABLE a RAIN_ROOT Receive frequency.
    (3) The RAIN_ROOT enables a RAIN_ROOT Transmit frequency (with increased power) and reconfigures the RAIN_BRANCH Receive frequency into the network associated with the RAIN_ROOT Transmit frequency.
  (b) A temporary SINGLE_ROOTED network is configured from part of a ROOTED Network as follows:
    (1) The RAIN_BRANCH DISABLES its normal Receive frequency, ENABLES a RAIN_ROOT Receive frequency, and increases Transmit power. The transmit frequency and RAIN_ROOT Receive frequency are configured as a network and Transmit frequency remains ROOTED.
    (2) The other BRANCH(es) are not involved.
    (3) The DOUBLE_HOPPING ROOT enables a RAIN_ROOT Transmit frequency (with increased power) and reconfigures the RAIN_BRANCH Receive frequency into the network associated with the RAIN_ROOT Transmit frequency.
  (c) When the rain stops, the complex processing in (A) and (B) above is reversed.

3.9—PROTECTED Network

The Vitalink Bridge supports a concept termed a PROTECTED Network. A PROTECTED Network has a Transmit access point which is configured as PROTECTED.

If a Transmit access point is PROTECTED the Forwarding Function will only forward frames to that access point which have an FDSE which matches the Destination GLOBAL_ADDRESS. (single destination or multicast/broadcast). All other Forwarding rules apply The PROTECTED Network concept allows the PROTECTED station to interface to the Vitalink Bridge utilizing ENET frames without having to filter superfluous frames. Consequently PROTECTED Networks can have a lower bandwidth than NON_PROTECTED networks and and the processing capacity of the PROTECTED Station can be much less than a Bridge.

It is anticipated that a PROTECTED Station will configure most of the FDSE's in the associated Bridge using standard Bridge Management commands. The known exception is the FDSE which matches the GLOBAL_ADDRESS of the Station. The FDSE can be built in the normal fashion from a source GLOBAL_ADDRESS.

A Bridge cannot be a PROTECTED Station relative to any Network.

SECTION 4—HIGH LEVEL DESIGN OVERVIEW 4.1—Vitalink Bridge Roles

The primary role of Vitalink's Bridge is to relay Extended Network(ENET) frames to/from Vitalink's Satellite Backbone Network. This role is illustrated in FIG. 10.

Secondary roles the Vitalink Bridge will also support are illustrated in FIG. 11.

From a design perspective, a Vitalink Bridge will be capable of supporting the following Bridge roles:
  (a) MULTI_END_POINT medium(s) to MULTI_END_POINT medium(s) (e.g. Satellite Backbones and/or LANs to Satellite Backbones and/or LANs)
  (b) DUAL_END_POINT medium(s) to MULTI_END—POINT medium(s) (e.g. Terrestrial Links to Satellite Backbones and/or LANs)
  (c) DUAL_END_POINT medium(s) to DUAL_END_POINT medium(s) (e.g. Terrestrial Links to Terrestrial Links etc.)

4.2—Functional Areas

Conceptually, the Vitalink Bridge design is divided into four functional areas:
  (a) Forwarding Function
  (b) Local/Backbone Network Control
  (c) Management Functions
  (d) Executive Functions The logical organization of these functional areas is illustrated in FIG. 12.

The Vitalink Bridge design has one Forwarding Function, one set of Management Functions, and one set of Executive Functions. These functions are executed by a CPU on the Main CPU (MCPU) board.

When the Vitalink Bridge is supporting multiple local and/or backbone networks, the Bridge will respectively contain multiple Local and/or Backbone Network Control Functions. The Local and Backbone Network Control Functions execute on both the MCPU board and their respective interface boards. . bp SECTION 5—FORWARDING FUNCTION The Forwarding Function conditionally forwards Extended Network Packets between two of the following:
  (a) Local Network Control
  (b) Backbone Network Control
  (c) Management Functions All Network Control processes which input packets to the Forwarding Function run as Interrupt handlers. Management Functions which input ENET frames run as Tasks. A typical forwarding sequence for a ENET frame from a local network is illustrated in FIG. 13.

The discard time of single destination ENET frames from some NON_ROOTED Local Networks can be reduced significantly by utilizing a simple cache. A Discard Cache is useful when on the average there are only a few stations actively utilizing the Local Network to interact with other local stations. A Discard Cache should:
  (a) contain the last n source GLOBAL_ADDRESSes received from the network (n should equal at least 2× the interacting station average)
  (b) be accessable by a rudimentary Network Control Forwarding Function
  (c) be used for discarding only, not forwarding
  (d) not interfere with the use and maintenance of the FDS.

A typical forwarding sequence for a ENET frame from Management Functions is illustrated in FIG. 14.

5.1—Data Stores 5.1.1—Forwarding Data Store (FDS)

The FDS is used by the Forwarding Function to determine how to forward single or multicast destination frames. For single destination frames, the FDS has a single entry (FDSE) for each address that has been seen as a source address in a recently processed ENET frame. All multicast FDSE's and optionally single destination FDSE's are created from Reconfiguration or Set Parameters commands An FDS may contain from 1 to 65,536 Non Collision FDSE's and 0 to 8192 Collision FDSE's (CFDSE). The FDSE's and CFDSE's may share the same contigious memory segment (up to 524,288 octets) or two different contigious segments. When the number of FDSE's and CFDSE's exceeds 8192, the CFDSE's must come from a contiguous segment of up to 65,536. An FDS with one shared 65,536 octet segment has the format shown in FIG. 15.

The FDSE variables are defined below:
  (a) the first 40 bits of GLOBAL_ADDRESS that was used to to create this FDSE. In single destination FDSE's, if the SNID equals ZERO, the GLOBAL_ADDRESS identifies this Bridge.
  (b) SNID/AID is defined as follows:
    (1) in single destination frames the field is a Source NID (SNID) and bits 40-47 contain the SNID value associated with the received ENET frame that was used to create this FDSE.
    (2) for multicast destination frames, bits 40-47 contain an Array ID (AID) value that identifies the Multicast Array Data Store Entry associated with the multicast GLOBAL_ADDRESS used to create this FDSE.
  (c) FFF, bits 48-50, which contain the following flags:
    (1) FORWARD/DO_NOT_FORWARD ENET frame with matching Destination GLOBAL_ADDRESS (1 bit). This flag currently not used in a multicast FDSE.
  (2) Aging Value (2 bits), one of the following values
    a. RECENTLY_USED
    b. NOT_RECENTLY_USED (at least 1 DELETE cycle)
    c. NOT_RECENTLY_USED (at least 2 DELETE cycles)
    d. FIXED (can not be removed due to aging). Multicast FDSE's always have this value.
  (d) the CFDSE_INDEX, bits 51-63, which contains either:
    (1) ZERO, if there is not a subsequent CFDSE or
    (2) the INDEX associated with the next CFDSE 5.1.2—Receive/Transmit Data Store(R/TDS)

This data store contains the following:
  (a) Bridge State (INIT/LISTEN/OPERATE/BROKEN)
  (b) Bridge FDSE Type (LEARNING/NOT_LEARNING), Default=LEARNING
  (c) Multicast Monitor Mode (TRUE/FALSE), Default=FALSE
  (d) Transmit Data Store Entries(TDSE's) exist for each Transmit access point. Each TDSE has a unique NID value, termed a TNID. The TNID values range from 00(16) to 39(16).TNID 00(16) is associated with Management Functions.

The TDSE's are ordered such that the TNID can be used as an index to locate the associated TDSE. Each TDSE contains the following:
    (1) State (OFF/INIT/ON/BROKEN)
    (2) BROKEN Reason (LOOP_DETECTED)
    (3) Type (NOT_PROTECTED/PROTECTED)
    (4) Topology (NON_ROOTED/RAIN_ROOTED/ROOTED_BRANCH/ROOT/RAIN_ROOT/SECONDARY_ROOT)
    (5) Network Type (SATELLITE/TERRESTRIAL/ETHERNET_802.3/MANAGEMENT)
    (6) Statistics
      a. Frames Transmitted
        1. Single Destination (matching FDSE)
        2. Single Destination (no FDSE)
        3. Multicast Destination (matching FDSE)
      b. Bytes Transmitted (optional)
      c. Frames Discarded (congestion)
  (e) Receive Data Store Entries(RDSE's) exist for each Receive access point. Each RDSE has a unique NID value, termed a RNID. The RNID values range from 40(16) to 79(16). RNID 40(16) is associated with Management Functions.

The RDSE's are ordered such that an RNID minus 40(16) can be used as an index to locate the associated RDSE. Each RDSE contains the following:
    (1) State (OFF/INIT/ON/BROKEN)
    (2) BROKEN Reason (LOOP_DETECTED)
    (3) Type (TRANSMIT_RECEIVE/RECEIVE_ONLY)
    (4) TNID (The value of the Transmit access point associated with this Receive access point)
    (5) RAIN (TRUE/FALSE)
    (6) Network Type (SATELLITE/TERRESTRIAL/ETHERNET_802.3/MANAGEMENT)

(7) NON_Encapsulanted frames flag (CONTAIN/DO_NOT_CONTAIN an FCS) If associated TDSE Type equals PROTECTED, the DEFAULT value equals DO_NOT_CONTAIN. Otherwise, the DEFAULT equals CONTAIN (8) Statistics
  a. Frames Received
  b. Frames Discarded
  c. Bytes Received (optional)

(8) The Alarm Counters for each type of Backbone Encapsulation. (i.e. BE errors, RBE errors, RE errors, RRE errors, RRDU errors, RRU errors)

5.1.3—Multicast Array Data Store (MADS)

This data store contains a set of bit array entries (MADSE) arranged in AID order such that the AID values in multicast FDSE's can be used as indexes to locate an associated MADSE. Each MADSE has the sturcture shown in FIG. 16.

As illustrated in FIG. 16, a MADSE contains a set of bits associated with TDSE's and a set associated with RDSE's. Each bit is associated with one TDSE or RDSE NID value (including MANAGEMENT) and is defined as follows:
  (a) each TDSE Bit is defined as follows:
    0=FORWARD to the associated TDSE network (DEFAULT)
    1=DO_NOT_FORWARD to the associated TDSE network
  (b) each RDSE Bit is defined as follows:
    0=FORWARD from the associated RDSE network (DEFAULT)
    1=DO_NOT_FORWARD from the associated RDSE network 5.1.4—No Match Array Data Store (NADS)

This data store contains a single bit array (NADSE) which has the same structure as a MADSE. A NADSE contains a set of bits associated with TDSE's and a set associated with RDSE's. Each bit is associated with one TDSE or RDSE NID value (including MANAGEMENT) and is defined as follows:
  (a) each TDSE Bit is defined as follows:
    0=FORWARD to the associated TDSE network (DEFAULT)
    1=DO_NOT_FORWARD to the associated TDSE network (These bits are used to support a PROTECTED TDSE Type)
  (b) each ROSE Bit is defined as follows:
    0=FORWARD from the associated RDSE network (DEFAULT)
    1=DO_NOT_FORWARD from the associated RDSE network (currently the RDSE bits are not used)

5.1.5—Discard Broadcast Type Data Store (DBTDS)

A desending list of 0 to 15 Ethernet Type values. The last Type value always equals ZERO. If the list is empty, the first entry equals ZERO. A MATCHING_FRAME_COUNT is associated with each value.

5.1.6—Circular Input Queue Data Store

The Circular Input Queue(CIQ) data store is used by the Forwarding Function to input ENET frame processing information to the Forwarding Data Store Maintenance Process. The CIQ contains the following:
  (a) a fixed maximum number of entries (CIQE's). Each CIQE contains the following information:
    (1) GLOBAL_ADDRESS=the Source Address from the ENET frame
    (2) SNID=Source NID parameter from the OUTPUT_CALL
  (b) a fixed maximum number of entries Configuration CIQE's (CCIQE). Each CCIQE contains the following information:
    (1) USED/NOT_USED flag
    (2) GLOBAL_ADDRESS=the FDSE GLOBAL_ADDRESS
    (3) SNID=the FDSE SNID value
  (c) The data store also contains the following queue depth and threshold values to monitor CIQ processing:
    (1) CIQE_TOTAL—the total number of CIQE's
    (2) EMPTY_CIQE—the number of empty CIQE's
    (3) THRESHOLD_2—an acceptable EMPTY_CIQE queue value that indicates that the CIQE maintence can take place at a normal priority.
    (4) THRESHOLD_1—an EMPTY_CIQE queue value that indicates that the number of non empty CIQE's is excessive
    (5) THRESHOLD_0—an EMPTY_CIQE queue value that is is used to limit the Forwarding Maintence processing time when the EMPTY_CIQE value equals zero.

5.1.7—FDSE Maintenance Data Store (FMDS)

This data store contains a pointer to the FDS and the LIFO queue of EMPTY_COLLISION_FDSE's. The data store also contains a the following:
  (a) the FDS HASH_INDEX_SIZE
  (b) count of TOTAL_NUMBER of FDSE's
  (c) count of CURRENTLY_DEQUEUED FDSE's
  (d) count of TOTAL_NUMBER of COLLISION_FDSE's
  (e) count of CURRENTLY_DEQUEUED COLLISION_FDSE's
  (d) and (e) are only present when FDSE's and COLLISION_FDSE's come from different memory segment (this will not be supported in the initial release)
  (f) count of MAXIMUM_NUMBER of FDSE's dequeued (high water mark)
  (g) the FDSE_SHORTAGE value. (i.e. CURRENTLY_DEQUEUED value which causes the invocation of the DELETE process)
  (h) count of number of DISCARDED_CIQE's
  (i) count of number of UPDATED FDSE's
  (j) the following counts of COLLISION_FDSE Index values with n_FDSE's
    (1) count of double collisions
    (2) count of triple collisions
    (3) count of quad. collisions
    (4) count of 5 or more collisions
  (h) count of number of RESET's received.

5.1.8—Priority 2 Forwarding Data Store Maintenance Mailbox

The Forwarding Data Store Maintenance Mailbox is used by the Management Functions to forward Network Management requests.

5.2—ENET Frame Service Interfaces

The Forwarding Function interfaces to both Network Control and Management Funtions. The input and output service interface between the Forwarding Function and Network Control is considered a Network Control service interface and consequently is defined in the Network Control section.

The input and output service interface between the Forwarding Function and Management Functions is considered a Forwarding Function service interface and consequently is defined below.

5.2.1—Forwarding Function Input

The Forwarding Function Input interface is the service interface utilized to input an ENET frame to Management Functions. The Forwarding Function Input Interface utilizes a procedure call and return. The required parameters for the call and return are:

INPUT_CALL (Forwarding Function to Management Functions)

INPUT_FRAME—The address of the linked list of buffer descriptors which identifies the complete ENET frame.

FCS—Identifies whether the ENET frame contains/does not contain an FCS.

SOURCE_NETWORK_IDENTIFIER(SNID)—A two octet system specific identifier which identifies the source network. The two octet field is defined as follows:

bits 0-7—These bits are reserved. They must have a value of 00(16).

bits 8-15—These bits contain the Source NID value

INPUT_RETURN (Management Functions to Forwarding Function)

RETURN_CODE—TBD.

5.2.2—Forwarding Function Output

The Forwarding Function Output interface is the service interface utilized to output an ENET frame from Management Functions. The Forwarding Function Output Interface utilizes a procedure call and return. The required parameters for the call and return are:

OUTPUT_CALL (Management Functions to Forwarding Function)

OUTPUT_FRAME—The address of the linked list of buffer descriptors which identify the complete ENET frame.

FCS—Identifies whether the ENET frame contains/does not contain an FCS.

SOURCE_NETWORK_IDENTIFIER(SNID)—A two octet system specific identifier which identifies the ENET frame source. The two octet field is defined as follows:

bits 0-7—These bits are reserved. They must have a value of 00(16).

bits 8-15—These bits contain the NID value of 00(16), which means the ENET frame is from Management Functions.

DESTINATION_NETWORK_IDENTIFIER(DNID)—A two octet system specific identifier which is defined as follows:

bits 0-7—are defined as OERRRRRR, where

0=the FORWARD_ONLY flag and is defined as follows:

0=FORWARD_ONLY flag is off

1=the ENET frame is to be forwarded only to the network associated with the NID in bits 8-15.

E=the FORWARD_EXCEPT flag and is defined as follows:

0=FORWARD_EXCEPT flag is off

1=the ENET frame is to be forwarded all networks except the network associated with the NID in bits 8-15. One used for Multicast frames.

RRRRRR=RESERVED and have a value of 000000(2).

bits 8-15—if the 0 and E flags equal 00(2), these bits have value of 00(16). Otherwise, these bits contain a SNID value which is used by the Forwarding Function to locate the associated TNID value OUTPUT_RETURN (Forwarding Function to Management Functions)

RETURN_CODE—tbd.

5.4—Forwarding Function Process Description

Upon receipt of a CALL containing an ENET frame, for Forwarding Function processes the frame as follows:

5.4.1—Pre-Forwarding Processing

If Bridge Type equals LEARNING, and the frame was input from Network Control, the SNID value is used to locate the associated RDSE (termed the SNID_RDSE). If the SNID_RDSE State is not equal to OFF, the Forwarding Funtion creates an entry in the Circular Input Queue(CIQ) and decrements the EMPTY_CIQE value. Normally, the Forwarding Funtion does not interact with the Forwarding Data Store Mainenance Process(FMP) running at PRIORITY_0. The exceptions are as follows.

(a) If the EMPTY_CIQE value equals THRESHOLD_1, the FMP is set dispatchable at its PRIORITY_1.

(b) If the EMPTY_CIQE value equals zero, the FMP is called by the Forwarding Function. The FMP executes (as an Interrupt Handler) until the EMPTY_CIQE value equals THRESHOLD_0.

5.4.2—Directed Forwarding of an ENET Frame

The ENET frame is Forwarded to the network identified in a DNID CALL parameter with the FORWARD_ONLY flag set as follows:

(a) If any of the following are true, the ENET frame will not be forwarded (1) the ENET frame was input from Network Control (2) the Forwarding State is equal to OFF (b) The DNID NID value is used to locate the associated TDSE.

(c) If TDSE equals OFF, the ENET frame will not be forwarded (d) Otherwise, it is forwarded to the network associated with the TDSE as follows:

(1) if TDSE Topology equals NON_ROOTED, ROOT, or SECONDARY_ROOT, the following occurs:

a. if there is no FCS, the frame is passed to the the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge b. Otherwise, the frame is passed to Network Control process (2) if TDSE Topology equals ROOTED_BRANCH, the frame is passed to the the Network Control Encapsulation process associated with the TDSE network. The value of the ENCAPAULATION_ID equals BE and the ENCAPSULATION_SOURCE_ADDRESS value equals the GLOBAL_ADDRESS of this Bridge (3) if TDSE Topology equals RAIN_ROOTED, the frame is passed to the the Network Control Encapsulation process associated with the TDSE network. The value of the ENCAPAULATION_ID equals RBE and the ENCAPSULATION_SOURCE_ADDRESS value equals the GLOBAL_ADDRESS of this Bridge (4) if TDSE Topology equals RAIN_ROOT processing is dependent, on the FDSE_RDSE RAIN value as follows:

(a) if RAIN equals FALSE, the following occurs:

(1) if there is no FCS, the frame is passed to the the Network Control Encapsulation process associated with the TDSE network. The value of the ENCAPAULATION_ID equals NOT_ENCAPSULATED and the ENCAPSULATION_SOURCE_ADDRESS value equals the GLOBAL_ADDRESS of this Bridge (2) Otherwise, the frame is passed to Network Control process (b) Otherwise, the frame is passed to the the Network Control Encapsulation process associated with the TDSE network. The value of the ENCAPAULATION_ID equals RRE and the ENCAPSULATION_SOURCE_ADDRESS value equals the GLOBAL_ADDRESS of this Bridge Otherwise, the forwarding of the ENET frame as defined below.

5.4.3.—Technique for locating a Matching FDSE

The Forwarding Function uses the desination GLOBAL_ADDRESS of a ENET frame to search the FDS to locate a matching FDSE. The technique for locating a matching FDSE is defined below:

(a) The trailing n bits (n=FDS_INDEX_SIZE) of the Destination GLOBAL_ADDRESS are multiplied by 2 and used as an index to the FDSE Index.

(b) If the indexed FDS Index value is 0000(16), there is no matching FDSE.

(c) Otherwise, the first 40 bits of the ENET frame's destination GLOBAL_ADDRESS is compared to the first 40 bits of the FDSE. If the two values are equal, a matching FDSE has been found.

(d) Otherwise, the FDSE CFDSE_INDEX is examined as follows:

(1) If equal to ZERO, there is no matching FDSE.

(2) Otherwise, the FDSE CFDSE_INDEX is used to locate the COLLISION_FDSE and processing continues as in b. above.

(e) If a matching FDSE or CFDSE is found it is refered to as the FDSE or the matching FDSE.

5.4.4—Forwarding of a Single Destination ENET frame

The forwarding of single destination ENET frames is dependent upon whether a matching FDSE was located. Both cases are defined below.

(a) If a matching FDSE also found, the following occurs:

(1) If the Ageing value in the matched FDSE is not equal to FIXED, it is set to the value of RECENTLY_USED.

(2) If the GLOBAL_ADDRESS is a local address[i.e., the FDSE SNID equals 00(16)], the ENET frame is forwarded to DIF (local address FDSE's have an Ageing value of FIXED).

(3) Otherwise, if the FDSE FORWARD_/DO_NOT_FORWARD flag has a value of DO_NOT_FORWARD, the frame is discarded.

(4) Otherwise, the RDSE associated with the SNID in the matched FDSE is Located (this RDSE is termed the FDSE_RDSE). If the FDSE_RDSE State is not equal to ON, the frame is discarded.

(5) Otherwise, the TDSE associated with the TNID in the FDSE_RDSE is Located (this is the only TDSE that will need to be Located). IF the TDSE's State equals to OFF, the frame is discarded.

(6) Otherwise, if the ENET frame was input from Management Functions, it is forwarded to the network associated with the TDSE. (i.e. Local Management Functions can forward during INIT/BROKEN) as follows:

a. if TDSE Topology equals NON_ROOTED, ROOT or SECONDARY_ROOT, the following occurs:

(1) if there is no FCS, the frame is passed to the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge (2) Otherwise, the frame is passed to Network Control process b. if TDSE Topology equals ROOTED_BRANCH, the frame is passed to the the Network Control Encapsulation process associated with the TDSE netwok. The value of the ENCAPAULATION_ID equals BE and the ENCAPSULATION_SOURCE_ADDRESS value equals the GLOBAL_ADDRESS of this Bridge c. if TDSE Topology equals RAIN_ROOTED, the frame is passed to the the Network Control Encapsulation process associated with the TDSE network. The value of the ENCAPAULATION_ID equals RBE and the ENCAPSULATION_SOURCE_ADDRESS value equals the GLOBAL_ADDRESS of this Bridge d. if TDSE Topology equals RAIN_ROOT processing is dependent, on the FDSE_RDSE RAIN value as follows:

(a) if RAIN equals FALSE, the frame is passed to Network the following occurs:

(1) if there is no FCS, the frame is passed to the the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge (2) Otherwise, the frame is passed to Network Control process (b) Otherwise, the frame is passed to the the Network Control Encapsulation process associated with the TDSE network. The value of the ENCAPAULATION_ID equals RRE and the ENCAPSULATION_SOUR- CE_ADDRESS value equals the GLOBAL_ADDRESS of this Bridge
(7) Otherwise, the frame is discarded, if either of the following is TRUE:
  a. The R/TDS Bridge State is not equal to OPERATE
  b. The TDSE State is not equal to ON
(8) Otherwise, the RDSE associated with the SNID INPUT_CALL parameter is located (this RDSE is termed the SNID_RDSF). If the SNID_RDSE State is not equal to ON, the frame is discarded. Otherwise, the TNID value in the SNID_RDSE is compared against the TNID value in the FDSE_RDSE.
  a. If equal, the following occurs:
    1. If the TDSE Topology equals NON_ROOTED, RAIN_ROOTED, ROOTED_BRANCH, or SECONDARY_ROOT, the ENET frame is discarded.
    2. If the TDSE Topology equals ROOT, the following occurs:
      (a) if the INPUT_CALL EID parameter equals BE, the ENET frame is passed to the Network Control Encapsulation process associated with the TDSE network. The value of the ENCAPAULATION_ID equals RE.
      (b) if the INPUT_CALL EID parameter equals NOT_ENCAPSULATED, the frame is discarded.
      (c) if the INPUT_CALL EID parameter does not equal BE, the following occurs:
        (1) an ALARM is generated.
        (2) the frame is discarded.
    3. Otherwise, the value of the TDSE Topology equals RAIN_ROOT and the processing of the ENET frame is based on the INPUT_CALL EID parameter as follows:
      (a) if the EID equals NOT_ENCAPSULATED, the following occurs:
        (1) The SNID_RDSE RAIN value is set to FALSE
        (2) if the FDSE_RDSE RAIN value equals TRUE, the ENET frame is passed to the Network Control Encapsulation process associated with the TDSE network. The value of the ENCAPSULATION_ID equals RRE
        (3) Otherwise, the ENET frame is discarded
      (b) if the ENCAPSULATION_ID equals RBE, the following occurs:
        (1) the SNID_RDSE RAIN value is set to TRUE
        (2) the ENET frame is passed to the Network Control Encapsulation process associated with the TDSE network. The value of the ENCAPAULATION_ID equals RRE (The FDSE_RDSE RAIN value is not examined because the BRANCH may be changing to RAIN)
      (c) Otherwise, the following occurs:
        (1) an ALARM is generated.
        (2) the frame is discarded
  b. Otherwise, if not equal, the ENET is forwarded to the TDSE network as follows (i.e., using the same logic as if the frame came from Management Functions)
    1. if TDSE Topology equals NON_ROOTED or ROOT, the following occurs:
      (a) if there is no FCS, the frame is passed to the the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge
      (b) Otherwise, the frame is passed to Network Control process
    2. if TDSE Topology equals ROOTED_BRANCH, the frame is passed to the the Network Control Encapsulation process associated with the TDSE network. The value of the ENCAPAULATION_ID equals BE.
    3. if TDSE Topology equals RAIN_ROOTED, the frame is passed to the the Network Control Encapsulation process associated with the TDSE network. The value of the ENCAPAULATION_ID equals RBE.
    4. if TDSE Topology equals RAIN_ROOT processing is dependent, on the FDSE_RDSE RAIN value as follows:
      (a) if RAIN equals FALSE, the following occurs:
        (1) if there is no FCS, the frame is passed to the the Network Control Encapsulation process associated with the TDSE network. The value of the ENCAPAULATION_ID equals NOT_ENCAPSULATED and the ENCAPSULATION_SOURCE_ADDRESS value equals the GLOBAL_ADDRESS of this Bridge
        (2) Otherwise, the frame is passed to Network Control process
      (b) Otherwise, the frame is passed to the the Network Control Encapsulation process associated with the TDSE network. The value of the ENCAPAULATION_ID equals RRE.
(b) If no matching FDSE is found, the ENET frame is processed as follows:
  (1) If the frame was input from Management Functions, and the NADSE bit associated with the MANAGEMENT RDSE equals DO_NOT_FORWARD, the frame is discarded. Othewise, the frame is forwarded as follows to all Transmit access points with a TDSE for which the TDSE Type is equal to TRANSMIT_RECEIVE and the TDSE State is not equal to OFF.
  a. if TDSE Topology equals SECONDARY_ROOT, NON_ROOTED, or ROOT, the following occurs:
    (1) if there is no FCS, the frame is passed to the the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge
    (2) Otherwise, the frame is passed to Network Control process b. if TDSE Topology equals ROOTED_BRANCH, the frame is passed to the the Network Control Encapsulation process associated with the TDSE network. The value of the ENCAPSULATION_ID equals BE and ENCAPSULATON_SOURCE_ADDRESS equals the GLOBLAL_ADDRESS of this Bridge c. if TDSE Topology equals RAIN_ROOTED, the frame is passed to the the Network Control Encapsulation process associated with the TDSE network. The value of the ENCAPSULATION_ID equals RBE and ENCAPSULATION_SOURCE_ADDRESS equals the GLOBLAL_ADDRESS of this Bridge d. if TDSE Topology equals RAIN_ROOT, the frame is passed to the the Network Control Encapsulation process associated with the TDSE network. The value of the ENCAPAULATION_ID equals RRU and ENCAPSULATION_SOURCE_ADDRESS equals the GLOBLAL_ADDRESS of this Bridge (2) If the frame was input from a local/backbone network, it is processed as follows:

a. If R/TDS Bridge State is not equal to OPERATE, the frame is discarded.

b. Otherwise, the RDSE associated with the SNID INPUT_CALL parameter is located (the located RDSE is again termed the SNID_RDSE). If the SNID_RDSE State is not equal to ON, the frame is discarded.

c. Otherwise, the ENET frame is forwarded to all Transmit access points with a TDSE as follows:

1. the TDSE State equals ON
2. The NADSE bit associated with the TDSE equals FORWARD.
3. if the TNID associated with the TDSE does not equal the SNID_TNID value the following occurs:

(a) if TDSE Topology equals NON_ROOTED SECONDARY_ROOT, or ROOT, the following occurs:

(1) if there is no FCS, the frame is passed to the the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge (2) Otherwise, the frame is passed to Network Control process (b) if TDSE Topology equals ROOTED_BRANCH, the frame is passed to the the Network Control Encapsulation process associated with the TDSE network. The value of the ENCAPAULATION_ID equals BE.

(c) if TDSE Topology equals RAIN_ROOTED, the frame is passed to the the Network Control Encapsulation process associated with the TDSE network. The value of the ENCAPAULATION_ID equals RBE.

(d) if TDSE Topology equals RAIN_ROOT, the frame is passed to the the Network Control Encapsulation process associated with the TDSE network. The value of the ENCAPSULATION_ID equals RRU.

4. If the TNID associated with the TDSE equals the SNID_RDSE TNID value the following occurs:

(a) if TDSE Topology equals NON_ROOTED, SECONDARY_ROOT, RAIN_ROOTED, or ROOTED_BRANCH, the frame is not forwarded.

(b) if TDSE Topology equals ROOT, the processing is dependent upon the INPUT_CALL EID parameter value as follows:

(1) if the EID equals BE, the ENET frame is passed to the the Network Control Encapsulation process associated with the TDSE network. The value of the ENCAPAULATION_ID equals RE.

(2) if the EID equals NOT_ENCAPSULATED, the ENET frame is not forwarded (3) Otherwise, the following occurs
{a} an ALARM is generated.
{b} the frame is not forwarded.

(c) if TDSE Topology equals RAIN_ROOT, the following occurs:

(1) if the EID equals
{a} NOT_ENCAPSULATED, the SNID_ROSE RAIN value is set to FALSE and the frame is passed to the the Network Control Encapsulation process associated with the TDSE network. The value of the ENCAPSULATION_ID equals RRDU.

{b} RBE, the SNID_ROSE RAIN value is set to TRUE and the frame is passed to the the Network Control Encapsulation process associated with the TDSE network. The value of the ENCAPSULATION_ID equals RRDU.

{c} Otherwise, the following occurs
{1} an ALARM is generated.
{2} the frame is discarded.

5.4.5—Forwarding of Multicast/Broadcast Destination ENET Frame

The forwarding of Multicast/Broadcast ENET frames is defined below:

(a) If the ENET frame was input from a local/backbone network, the following occurs:

(1) If a matching FDSE is not found (as described in 5.4.3), the following occurs:

a. if the R/TDS Bridge State is not equal to OPERATE, the frame is discarded.

b. Otherwise, the RDSE associated with the SNID INPUT_CALL parameter is located (the located RDSE is again termed the SNID_RDSE). If the SNID_RDSE State is not equal to ON, the frame is discarded.

c. Otherwise, if the NADSE bit associated with the SNID_RDSE SNID equals DO_NOT_FORWARD, the frame is discarded.

d. Otherwise, the forwarding of the ENET frame to each Transmit access point with a TDSE occurs as follows:

1. the TDSE State equals ON

2. The NADSE bit associated with the TDSE equals FORWARD.
3. if the TNID associated with the TDSE does not equal the SNID_RDSE TNID value the following occurs:
   (a) if TDSE Topology equals NON_ROOTED SECONDARY_ROOT, or ROOT, the following occurs:
   (1) if there is no FCS, the frame is passed to the the Network Control Encapsulation process associated with the TDSE network. The value of the ENCAPAULATION_ID equals NO_FCS, and the ENCAPSULATION_SOURCE_ADDRESS value equals the GLOBAL_ADDRESS of this Bridge
   (2) Otherwise, the frame is passed to Network Control process
   (b) Otherwise, if TDSE Topoloy equals ROOTED_BRANCH, the frame is passed to the the Network Control Encapsulation process associated with the TDSE network. The value of the ENCAPAULATION_ID equals BE.
   (c) Otherwise, if TDSE Topology equals RAIN_ROOTED, the frame is passed to the the Network Control Encapsulation process associated with the TDSE network. The value of the ENCAPAULATION_ID equals RBE.
   (d) Otherwise, if TDSE Topology equals RAIN_ROOT, the frame is passed to the the Network Control Encapsulation process associated with the TDSE network. The value of the ENCAPAULATION_ID equals RRU.
4. Otherwise, if the TNID associated with the TDSE equals the SNID_RDSE TNID value the following occurs:
   (a) if TDSE Topology equals NON_ROOTED, SECONDARY_ROOT, RAIN_ROOTED, or ROOTED_BRANCH, the frame is not forwarded.
   (b) Otherwise, if TDSE Topology equals ROOT, the processing is dependent upon the INPUT_CALL EID parameter value as follows:
   (1) if the EID equals BE, the ENET frame is passed to the the Network Control Encapsulation process associated with the TDSE network. The value of the ENCAPAULATION_ID equals RE.
   (2) if the EID equals NOT_ENCAPSULATED, the ENET frame is not forwarded
   (3) Otherwise, the following occurs
   {a} an ALARM is generated.
   {b} the frame is discarded.
   (c) Otherwise, if TDSE Topology equals RAIN_ROOT, the following occurs:
   (1) if the EID equals
   {a} NOT_ENCAPSULATED, the SNID_RDSE RAIN value is set to FALSE and the frame is passed to the the Network Control Encapsulation process associated with the TDSE network. The value of the ENCAPSULATION_ID equals RRDU.
   {b} RBE, the SNID_RDSE RAIN value is set to TRUE and the frame is passed to the the Network Control Encapsulation process associated with the TDSE network. The value of the ENCAPSULATION_ID equals RRDU.
   {c} Otherwise, the following occurs
   {1} an ALARM is generated.
   {2} the frame is discarded
(2) If a matching FDSE is found (as described in 5.4.3), the following occurs:
   a. the associated MADSE is located using the FDSE AID value.
   b. if either the MADSE bit associated with the MANAGEMENT TDSE equals FORWARD or the R/TDS Multicast Monitor Mode flag equals TRUE, a copy of the ENET frame is forwarded to Management Functions
   c. Otherwise, if the Destination Address value equals the Broadcast value and the Type field matches a value in the DBTDS, the frame is discarded and the associated MATCHING_FRAME_COUNT value is incremented.
   d. Otherwise, if the R/TDS Bridge State is not equal to OPERATE, the frame is discarded.
   e. Otherwise, the RDSE associated with the SNID INPUT_CALL parameter is located (the located RDSE is again termed the SNID_RDSE). If the SNID_RDSE State is not equal to ON, the frame is discarded.
   f. Otherwise, the MADSE bit associated with the SNID_RDSE parameter in the INPUT_CALL is located. If the value of the located bit equals DO_NOT_FORWARD, the ENET frame is discarded.
   g. The forwarding of the ENET frame to each Transmit access points with a TDSE occurs as follows:
   1. The TDSE State equals ON
   2. The MADSE bit associated with the TDSE equals FORWARD.
   3. if the TNID associated with the TDSE does not equal the SNID_RDSE TNID value the following occurs:
   (a) if TDSE Topology equals NON_ROOTED SECONDARY_ROOT, or ROOT, the following occurs:
   (1) if there is no FCS, the frame is passed to the the Network Control Encapsulation process associated with the TDSE network. The value of the ENCAPAULATION_ID equals NO_FCS and the ENCAPSULATION_SOURCE_ADDRESS value equals the GLOBAL_ADDRESS of this Bridge
   (2) Otherwise, the frame is passed to Network Control process
   (c) Otherwise, if TDSE Topology equals or ROOTED_BRANCH, the frame is passed to the the Network Control Encapsulation process associated with the TDSE network. The value of the ENCAPAULATION_ID equals BE.
   (d) Otherwise, if TDSE Topology equals RAIN_ROOTED, the frame is passed to the the Network Control Encapsulation process associated with the TDSE network.

The value of the ENCAPAULATION_ID equals RBE.
  (e) Otherwise, if TDSE Topology equals RAIN_ROOT, the frame is passed to the the Network Control Encapsulation process associated with the TDSE network. The value of the ENCAPAULATION_ID equals RRU.
4. Otherwise, if the TNID associated with the TDSE equals the SNID_RDSE TNID value the following occurs:
  (a) if TDSE Topology equals NON_ROOTED, SECONDARY_ROOT, RAIN_ROOTED, or ROOTED_BRANCH, the frame is not forwarded.
  (b) Otherwise, if TDSE Topology equals ROOT, the processing is dependent upon the INPUT_CALL EID parameter value as follows:
    (1) if the EID equals BE, the ENET frame is passed to the the Network Control Encapsulation process associated with the TDSE network. The value of the ENCAPAULATION_ID equals RE.
    (2) if the EID equals NOT_ENCAPSULATED, the ENET frame is not forwarded
    (3) Otherwise, the following occurs
    {a} an ALARM is generated.
    {b} the frame is discarded.
  (c) Otherwise, if TDSE Topology equals RAIN_ROOT, the following occurs:
    (1) if the EID equals
    {a} NOT_ENCAPSULATED, the SNID_RDSE RAIN value is set to FALSE and the frame is passed to the the Network Control Encapsulation process associated with the TDSE network. The value of the ENCAPSULATION_ID equals RRDU.
    {b} RBE, the SNID_RDSE RAIN value is set to TRUE and the frame is passed to the the Network Control Encapsulation process associated with the TDSE network. The value of the ENCAPSULATION_ID equals RRDU.
    {c} Otherwise, the following occurs
    {1} an ALARM is generated
    {2} the frame is not forwarded
(b) Otherwise, the ENET frame was input from Management Functions and the following occurs:
  (1) If the frame was input from Management Functions, and the NADSE bit associated with the MANAGEMENT RDSE equals DO_NOT_FORWARD, the frame is discarded. Otherwise, the frame is forwarded as follows to all Transmit access points with a TDSE for which the TDSE Type is equal to TRANSMIT_RECIEVE and the TDSE State is not equal to OFF.
    b. the TDSE State is not equal to OFF.
    c. If the OUTPUT_CALL contained a DNID with the FORWARD_EXCEPT flag, the NID associated with the TDSE network does not equal the NID value in the DNID.
    d. if TDSE Topology equals SECONDARY_ROOT, NON_ROOTED, or ROOT, the following occurs:
      1. if there is no FCS, the frame is passed to the the Network Control Encapsulation process associated with the TDSE network. The value of the ENCAPAULATION_ID equals NOT_ENCAPSULATED and the ENCAPSULATION_SOURCE_ADDRESS value equals the GLOBAL_ADDRESS of this Bridge
      2. Otherwise, the frame is passed to Network Control process
    e. if TDSE Topology equals ROOTED_BRANCH, the frame is passed to the the Network Control Encapsulation process associated with the TDSE network. The value of the ENCAPSULATION_ID equals BE and ENCAPSULATION_SOURCE_ADDRESS equals the GLOBLAL_ADDRESS of this Bridge
    f. if TDSE Topology equals RAIN_ROOTED, the frame is passed to the the Network Control Encapsulation process associated with the TDSE network. The value of the ENCAPSULATION_ID equals RBE and ENCAPSULATION_SOURCE_ADDRESS equals the GLOBLAL_ADDRESS of this Bridge
    g. if TDSE Topology equals RAIN_ROOT, the frame is passed to the the Network Control Encapsulation process associated with the TDSE network. The value of the ENCAPAULATION_ID equals RRU. and ENCAPSULATION_SOURCE_ADDRESS equals the GLOBLAL_ADDRESS of this Bridge
(2) Otherwise, a matching FDSE is found (as described in 5.4.3), and the associated MADSE is located using the FDSE AID value.
(3) if the MADSE bit associated with the MANAGEMENT RDSE equals DO_NOT_FORWARD, the frame is discarded.
(4) Otherwise, the ENET frame is forwarded to all Transmit access points:
  a. the TDSE State is not equal to OFF.
  b. If the OUTPUT_CALL contained a DNID with the FORWARD_EXCEPT flag, the NID associated with the TDSE network does not equal the NID value in the DNID.
  c. the MADSE bit associated with the TDSE TNID equals FORWARD
  d. if TDSE Topology equals NON_ROOTED, SECONDARY_ROOT <or ROOT, the following occurs:
    1. if there is no FCS, the frame is passed to the the Network Control Encapsulation process associated with the TDSE network. The value of the ENCAPAULATION_ID equals NOT_ENCAPSULATED and the ENCAPSULATION_SOURCE_ADDRESS value equals the GLOBAL_ADDRESS of this Bridge.
    2. Otherwise, the frame is passed to Network Control process
  f. if TDSE Topology equals RAIN_ROOTED, the frame is passed to the the Network Control Encapsulation process associated with the TDSE network. The value of the ENCAPSULATION_ID equals RBE and ENCAPSULATION_SOURCE_ADDRESS equals the GLOBLAL_ADDRESS of this Bridge
  g. if TDSE Topology equals ROOTED_BRANCH, the frame is passed to the the Network Control Encapsulation process associated with the TDSE network. The value of the ENCAPSULATION_ID equals BE and ENCAPSULATION_SOURCE_ADDRESS equals the GLOBLAL_ADDRESS of this Bridge h. if TDSE Topology equals RAIN_ROOT, the frame is passed to the the Network Control Encapsulation process associated with the TDSE network. The value of the ENCAPAULATION_ID equals RRU and ENCAPSULATION_SOURCE_ADDRESS equals the GLOBLAL_ADDRESS of this Bridge 5.5—Forwarding Data Store Maintenance Process Description The Forwarding Data Store Maintenance Processes(FMP's) are totally responsible for maintaining the Forwarding Data Store. (The special TRB and ROB processing must still be added to this Section) Maintenance of the data store includes:
(a) Creating new FDSE's.
(b) Updating existing FDSE's.
(c) Deleting unused FDSE's.

The creating of new entries and updating existing entries is handled by a CREATE_UPDATE process that runs at 3 priorities:
PRIORITY_2—a high background priority
PRIORITY_1—a priority which is higher than all background tasks
PRIORITY_0—a priority which interrupts the Forwarding Function processing.

When a Reset Request is received, the entire FDS must be purged. This is handled by a RESET process which runs at PRIORITY_1

Deleting old entries is handled by a DELETE process that normally runs at PRIORITY_3 which is lower than PRIORITY_2. However, in some cases the DELETE process is CALLED by the CREATE_UPDATE Process.

SECTION 6—Local/Backbone Network Control

The logical structure of a local or Backbone Network Control is illustrated in FIG. 17.

As FIG. 17 illustrates, there are two external interfaces to a Local/Backbone Network Control. The interface labeled 1. is the Frame-Related interface and is between the Forwarding Function and one of the following processes:
(a) Network Interface
(b) Translation
(c) Encapsulation/Decapsulation The interface labeled 2. is the Management-Related interface and is a queued interface. These interfaces are discussed later in this section. The above figure also identifies the following major processes within a Local/Backbone Network Control.
(a) Translation or Encapsulation/Decapsulation
(b) Network interface
(b) Local/Backbone Network Management These processes are also discussed later in this section.

6.1—Data Stores 6.1.1—Local/Backbone Network Interface(NI) Data Store An NI data store is defined for each local/backbone network. The data store contains the following:
(a) the NID of local/backbone network
(b) the state of the local/backbone network (OFF, INIT, ON, BROKEN).
(c) the Mode of the local/backbone network (NORMAL/PROMISCUOUS)
(d) pointers to the following:
 (1) Network Interface Output Queue Data Store
 (2) Network Interface Input Queue Data Store
 (3) Input Filter Data Store
 (4) Management Functions mailbox
 (5) Init Process mailbox 6.1.2—Network Interface Output Queue(NIOQ) DATA Store The NIOQ contains a FIFO queue for ENET frames to be transmitted to a local/backbone network. A Network Interface process in the MCPU inserts the ENET frames into the NIOQ. A Network Interface processes in the network interface board removes the ENET frames in a FIFO manner. The NIOQ also contains the following statistics:
 (1) Frames Sent
 (2) Bytes Sent
 (3) Current Queue Depth in Bytes
 (4) Discard Depth in Bytes Each of the above statistical fields is a 32 bit unsigned integer.

6.1.3—Network Interface Input Queue(NIIQ) Data Store

The NIIQ contains a FIFO queue for ENET frames received from a local/backbone network. A Network Interface process on the network interface board inserts ENET frames into the NIIQ. A Network Interface process in the MCPU removes the ENET frames in a FIFO manner. The NIOQ also contains a pointer to the associated NI and the following statistics:
 (1) Frames Received
 (2) Bytes Received
 (3) Bridge Frames Received (frames sent to this system)
 (4) Bridge Bytes Received (bytes sent to this system)

Each of the above statistical fields is a 32 bit unsigned integer.

6.1.4—Input Filter Data Store

The Filter data store(FILDS) contains the following address information that is utilized to filter Received frames.
(a) If the network is in NORMAL mode, the data store contains the system's GLOBAL_ADDRESS.
(b) the data store also contains the following:
 (1) a 40 bit VITALINK_MULTICAST_ID field which is defined as follows:
  a. the first 24 bits equals the assigned Vitalink Company value plus the broadcast bit (bit 7=1).
  b. the last 16 bits are set to zero
 (2) The following list of FILDS entries. Each FILDSE is associated with either:
  (a) a non encapsulated ENET frame with an FCS
  (b) the last 8 bits of an assigned Vitalink Multicast value

| FILDSE FLAGS | ASSOCIATED VALUE |
| --- | --- |

-continued

| | |
|---|---|
| PASS/DISCARD/ERROR | FCS (ENET frame with FCS) |
| PASS/DISCARD/DECAPSULATE/ERROR | NO_FCS | two sets of the following FILDSE's are specified, one for
ENET Frames without FCS's and one for ENET frames with FCS's.

| | |
|---|---|
| PASS/DISCARD/DECAPSULATE/ERROR | BRANCH-ENCAPSULATION(RE) |
| PASS/DISCARD/DECAPSULATE/ERROR | ROOT_ENCAPSULATION(RE) |
| PASS/DISCARD/DECAPSULATE/ERROR | RAIN_ROOT_ENCAPSULATION(RRE) |
| PASS/DISCARD/DECAPSULATE/ERROR | RAIN_ROOT_DOUBLE_HOPPED_UNKNOWN(RRDU) |
| PASS/DISCARD/DECAPSULATE/ERROR | RAIN_ROOT_UNKNOWN (RRU) |
| PASS/DISCARD/DECAPSULATE/ERROR | RAIN_BRANCH_ENCAPSULATION (RBE) |

Each FILDSE also contains a contains a count of the number
ERROR frames discarded.
The FILDSE flag values are set based on the value of the
associated TDSE Topology as defined below. Other than FCS,
the FILDSE flag value of PASS is only used in BMUX's and
IMUX's where all multicast values are configured as PASS.

| TDSE TOPOLOGY | FILDSE MULTICAST VALUES | FILDSE FLAG VALUE |
|---|---|---|
| NON_ROOTED | FCS | PASS |
| | NO_FCS+RRE+RRDU+RRU | DECAPSULATE |
| | RBE | DISCARD |
| | BE+RE | ERROR |
| RAIN_ROOTED | RRE+RRDU+RRU | DECAPSULATE |
| | FCS+NO_FCS+RBE | DISCARD |
| | BE+RE | ERROR |
| ROOTED_BRANCH | FCS | PASS |
| | NO_FCS+RE | DECAPSULATE |
| | BE+PRE+RRDU+RRU+RBE | ERROR |
| ROOT | FCS | PASS |
| | NO_FCS+BE | DECAPSULATE |
| | RE+RPE+RRDU+RRU+RBE | ERROR |
| RAIN_ROOT | FCS | PASS |
| | NO_FCS+RBE | DECAPSULATE |
| | BE+RE+RRE+RRDU+RRU | ERROR |
| SECONDARY_ROOT | FCS | PASS |
| | NO_FCS+BE | DECAPSULATE |
| | RE | DISCARD |
| | RRE+RRDU+RRU+RBE | ERROR |

6.1.5—Network Control(NC) Mailbox

A FIFO queue with two priorities, normal and urgent. An urgent message is inserted at the front of the queue, after other urgent messages. All Data Link management requests are inserted the NC mailbox.

6.1.6—Network Dependent Management Mailboxes

FIFO queues with two priorities, Normal and Urgent. An Urgent message is inserted at the front of the queue, after other Urgent messages. All Local/Backbone Network dependent Management processes (e.g., initialization) receive Network Management requests from these queues.

6.2—ENET Frame-Related Interface

The Network Control interface to the Forwarding Function exchanges only ENET Frames. The input and output Network Control service interfaces are defined below.

6.2.1—Network Control Input

The Network Control Input interface is the service interface utilized to input an ENET frame to Forwarding Function. The Network Control Input Interface utilizes a procedure call and return. The required parameters for the call and return are:

INPUT CALL (Network Control to Forwarding Function)
  INPUT_FRAME—The address of the linked list of buffer descriptors which identifies the complete ENET Frame.
  FCS—TRUE/FALSE. Identifies whether the ENET frame contains/does not contain an FCS. If the frame was Decapsulated the value of this Field is set from the EID value. Otherwise, it is set from the value of the NON_Encapsulated frames flag in the associated RDSE.
  SNID—A two octet system specific identifier which identifies the source network. The two octet field is defined as follows:
    bits 0–7—These bits are reserved. They must have a value of 00(16).
    bits 8–15—These bits contain the source NID value associated with this ENET frame.
  ENCAPSULATION_ID (EID)—If the frame was DECAPSULATED, this is the value of Bits 40–47 of the DECAPSULATED Destination Multicast GLOBAL_ADDRESS. If the Frame was not DECAPSULATED, this field equals ZERO.
  ENCAPSULATION_SOURCE_ADDRESS-(ESA)—If the ENCAPSULATION_ID value is NON_ZERO, this is the DECAPSULATED Source GLOBAL_ADDRESS. Otherwise, this field contains the GLOBAL_ADDRESS of the local Bridge
INPUT RETURN (Forwarding Function to Network Control)
  RETURN CODE—TBD.

6.2.2—Network Control Output

All output from the Forwarding Function utilizes a procedure call and return. Network Control and the Forwarding Function run at the same priority. The required parameters for the call and return are:

OUTPUT_CALL (Forwarding Function to Network Control)

OUTPUT_FRAME—The address of the linked list of buffer descriptors which identify the input ENET frame.

FCS—TRUE/FALSE. Identifies whether the ENET frame has an FCS or NO_FCS. The value of the FCS equals the FCS value of the INPUT CALL.

SNID—A two octet system specific identifier which identifies the source network. The two octet field is defined as follows:
- bits 0–7—These bits are reserved. They currently are ignored by Network Control.
- bits 8–15—These bits contain the Source NID value. If input from Management Functions this parameter has a value of 00(16).

ENCAPSULATION_ID (EID)—If the frame is to be ENCAPSULATED, this is used in computing the value of Bits 40–47 of the ENCAPSULATION Destination Multicast GLOBAL_ADDRESS. If the Frame is not to be ENCAPSULATED, this field equals ZERO.

ENCAPSULATION_SOURCE_ADDRESS (ESA)—If the ENCAPSULATION_ID value is NON_ZERO, this is the ENCAPSULATION Source GLOBAL_ADDRESS. (e.g., the ESA parameter from INPUT_CALL). Otherwise, this field is ignored by NC.

OUTPUT RETURN (Network Control to Forwarding Function)

RETURN CODE—NOT_DISCARDED/DISCARDED

6.3—Frame-Related Process Description

As was stated earlier, the ENET frame-related interface is between the Forwarding Function and Multiple Network Control processes. Logically, the Forwarding Function may directly interface with the Network Interface process. In other cases, the Forwarding Function interfaces with a network specific Translation process or with a network specific Encapsulation/Decapsulation process. These different cases are discussed below.

6.3.1—Network Interface To/From Forwarding Function

This mode of operation is possible when ENCAPSULATION/DECAPSULATION is not required by the underlining Local/Backbone Network. In this case, input and output ENET frames flow through Network Control as follows:

(a) Input Frames

When a ENET frame has been received and completely processed by the Network Interface Board process(es), it is placed in the associated Network Interface Input Queue. The ENET frame is subsequently removed (in a FIFO manner) by a Network Interface Process on the MCPU. If the state of the Network Interface is "ON", the ENET frame is passed to the Forwarding Function in an Input Call. (EID=NOT_ENCAPSULATED, FCS=TRUE)

(b) Output Frames

When the Network Interface process receives an Output Call from Forwarding Function, the following occurs:
(1) it locates the Network Interface Output Queue data store with a NID equal to the NID in in the Output Call.
(2) If the Current Queue Depth is greater than the Discard Depth, the frame is discarded and a RETURN_CODE of DISCARDED is generated.
(3) Otherwise, the following occurs:
 a. The ENET frame is then inserted on the queue.
 b. The NIOQ Statistics fields are incremented as approiate
 c. A RETURN_CODE of NOT$_{13}$ DISCARDED is generated.

The process on the Network Interface Board dequeues the ENET frames in FIFO manner and transmits them.

6.3.2—Network Translation To/From Forwarding Function

This mode of operation is utilized when the underlining local/backbone network does not utilize the ENET frame, but a simple transformation is possible. In this case the input and output ENET frame flow changes as follows:

(a) Input Frames

The Network Interface process on MCPU passes input non-ENET frames to the network specific Translation process instead of the Forwarding Function. The network specific non-ENET frame is then translated into an ENET frame and is then passed to the Forwarding Function in an Input Call.

(b) Output Frames

The network specific Translation process receives the Output Call from the Forwarding Function instead of the Network Interface process. The output ENET frame is translated into the network specific frame. The network specific frame is then passed to the Network Interface process to be inserted on the Network Interface Output queue.

It is anticipated that this mode of operation will be utilized to interface to other 802 LAN's. The High Level design will be completed when the decision to interface to one or more of these LAN's is made.

6.3.3—Backbone Encapsulation/Decapsulation From/To Forwarding Function

As described in Section 3, this mode of operation is utilized for handling ROOTED configurations and Ku band rain. Certain input and output ENET frames from/to the Forwarding Function must be encapsulated/decapsulated. (See Section 5). ENET frames without an FCS are also encapsulated/decapsulated when transmitted across a Backbone network that does not utilize the ENET 32 bit FCS.

Backbone Network encapsulation/decapsulation mode of operation is discussed below. This section DOES NOT describe the Local Network encapsulation/decapsulation mode of operation identified in Reference 2.1.

6.3.3.1—Encapsulation to a Backbone Network

When present, the Encapsulation process receives all OUTPUT_CALL's from the Forwarding Function. Only the Forwarding Function accesses the Encapsulation process. The ENET frame in the OUTPUT_CALL is encapsulated as illustrated in FIG. 18 and discussed below:

(a) Upon Receipt of an OUTPUT_CALL with a NON_ZERO ENCAPSULATION_ID or FCS=FALSE, the Encapsulation process encapsulates the ENET frame as illustrated above. The DA, SA, and DATA fields are defined as follows:

| | |
|---|---|
| DA (DESTINTION_ADDRESS) = | VITALINK_MULTICAST_ID (40 bits) + 4 bits 0000 + the following bit values computed from OUTPUT_CALL parameter values (1) FCS(TRUE/FALSE) bit (2) ENCAPSULATION_ID bits 5-7 |
| SA (SOURCE_ADDRESS) = | ESA parameter from OUTPUT_(ALL |
| DATA = | OUTPUT_FRAME parameter from OUTPUT_CALL |

(b) After the above encapsulated frame is created, it is passed the Network Interface process using the OUTPUT_CALL defined in Section 6.2.2.

6.3.3.2—Decapsulation from a Backbone Network

If a backbone Decapsulation process exists, the Network Interface process on the MCPU passes all input frames to the Decapsulation process. An encapsulated frame is decapsulated as illustrated in FIG. 19 and discussed below:

(a) Upon receipt of an INPUT_CALL (as defined in Section 6.2.1 with ZERO EID and ESA parameters), the decapsulation processes does the following:

(1) compares the first 40 bits of the frame's DESTINATION_ADDRESS to the VITALINK_MULTICAST_ID value. If not equal, the frame is not a BACKBONE_ENCAPSULATED frame and is associated with the FILDSE labeled FCS (2) Otherwise, the frames SOURCE_ADDRESS is compared to this Bridge's GLOBAL_ADDRESS. If equal, the frame is discarded.

(3) Otherwise, the Last 8 bits are used as an FILDSE index.

(b) The processing of the frame is determined by the FILDSE flag values as follows:

(1) If the flag equals DISCARD, the frame is discarded.

(2) If the flag equals DECAPSULATE, SA and DA fields are removed.

(3) If the flag equals PASS, the frame passes through the Decapsulation process unchanged.

(4) If the flag equals ERROR, the following occurs:
   a. the associated FILDSE ERROR count is incremented by 1
   b. if the count is less than 6, an ALARM is generated
   c. the frame is discarded.

(c) The Decapsulation process then passes all frames that were not discarded to the Forwarding Function using the INPUT_CALL defined in Section 6.2.1.

FIG. 20 is a pictorial view of a communications system for interconnected multiple local area networks and constructed in accordance with one embodiment of the present invention. FIG. 20 shows how the present invention is associated with a satellite. FIG. 20 also illustrates how the system of the present invention provides for modular expansion of extended networks.

The system shown in FIG. 20 embodies the apparatus and methods described above in this specification.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A communications system for interconnecting multiple local area networks across backbone networks independently and transparently of protocols above the data link layer and so that the multiple local area networks appear to the users of stations of all local area networks as one large single local area network, said system comprising, a plurality of local area networks with each local area network having at least one station for sending or receiving communications to or from another station using data link frames containing at least a destination address and a source address, at least one backbone network comprising only simplex broadcast channels and connecting two or more local area networks and wherein each backbone network has one and only one transmit simplex channel associated with one or more receive simplex channels, a plurality of bridge means with each bridge means interconnecting across simplex channels a plurality of local area networks to permit one or more stations in one local area network to communicate with one or more stations in one or more of the other local area networks, each said bridge means comprising, network interface means for interfacing the bridge to related local area networks and for sending information in frame format between related local area networks across one or more backbone networks, bridge management means for defining the association, in a backbone network, of the single transmit simplex channel and the receive simplex channels in three possible topologies, i.e. non-rooted, single rooted and multi rooted, learning means for learning the location of end user stations relative to the backbone network so that frames received from the backbone network can be forwarded or discarded, forwarding means for forwarding a frame received from one station in one local area network to a designated station in another local area network across one or more backbone networks independently and transparently of protocols above the data link layer, discarding means associated with each receive simplex channel for selectively discarding frames, wherein the transmit simplex channel characteristics are completely independent of receive simplex channel characteristics and the characteristics of each individual receive simplex channel are independent of other receive simplex channel characteristics, and wherein the backbone network is not required to be related to the local area network access technique or bandwidth.

2. The invention defined in claim 1 wherein the bridge means include local processes and the forwarding means are operative to forward a frame received from
(a) one station in one local area network attached to the bridge or
(b) a process within the same bridge means or
(c) simplex links attached to the bridge means to and from one or more
 (1) local area networks attached to the bridge means and
 (2) simplex channels attached to the bridge means and finally to a designated station in another local area network or
 (3) to a local process in another bridge means.

3. The invention defined in claim 1 wherein there is a unique network interface means operatively associated with each input and output simplex channel connected to the bridge means.

4. The invention defined in claim 2 wherein the bridge management means include data store and index means for associating the transmit simplex channel with one or more receive simplex channels to form a non-rooted, rooted or multirooted network.

5. The invention defined in claim 4 wherein the data store and index means include a forwarding data store which contains entries created from frames received with a unique source address value and a local variable which identifies the receive simplex channel of the frame.

6. The invention defined in claim 5 wherein the data store and index means are effective, for each entry created in the forwarding data store, to insert the address value also into a source network cache such that a frame received from the network with a destination address value already in the cache is discarded quickly without accessing the forwarding data store.

7. The invention defined in claim 5 wherein the forwarding means for locating a matching forwarding data store entry use the last 12–16 bits of a 48 bit destination address.

8. The invention defined in claim 5 wherein the discarding means discard a frame from an receive simplex channel based upon the recognition that the frame's receive simplex channel and the simplex channel identified in the matching forwarding data store entry are part of the same network so that discarding that frame thereby avoids unnecessary propagation.

9. The invention defined in claim 5 wherein the forwarding means for forwarding a frame to a transmit simplex channel are based on associating the receive simplex channel identified in the matching forwarding data store entry to the transmit simplex channel of the network to which the frame is to be forwarded.

10. The invention defined in claim 4 including encapsulation, decapsulation, and discarding means to give rooted and multi-rooted networks the appearance of being non-rooted such that the retransmitted frames are appropriately filtered.

11. The invention defined in claim 10 wherein the bridge management means include reconfiguration means for permitting reconfiguration, through communication with a reconfiguration process in the bridge means, of part of a network from a non-rooted to a rooted topology configuration and vice versa.

12. The invention defined in claim 11 wherein the dynamic reconfiguration means are constructed for dynamically reconfiguring the topology from a non-rooted to a rooted configuration and vice versa in response to a signal indicating the desirability of such reconfiguration.

13. The invention defined in claim 2 including configurable discarding means for allowing networks to be sheltered from frames with specific single destination addresses or multicast destination addresses such that those frames from remote local area networks are not forwarded onto specific simplex channels or input from specific input simplex channels to thereby preserve locality.

14. The invention defined in claim 2 including configurable discarding means for allowing networks to be sheltered from all but frames with specific destinations addresses.

15. The invention defined in claim 2 wherein the forwarding means execute in an interrupt level mode and including local processes that are within the bridge means and that execute in a non-interrupt mode such that the bridge management means of the bridge means cannot interfere with the forwarding means.

16. The invention defined in claim 4 wherein the data store and index means include a forwarding data store for receiving a frame and finding a matching forwarding data store entry for the single destination address,
the forwarding data store also contains a source network ID,
the source network ID is not a network in the sense of being a rooted network or a non-rooted network,
the source network ID identifies a receive simplex channel,
the transmit network ID identifies a transmit simplex channel,
the source network ID is used as an index into a receive data store,
the index locates a receive data store entry in the receive data store,
the entry so located defines the receive simplex channel,
one of the values in the located entry is a transmit network ID,
the transmit network ID is used as an index into the transmit data store,
said one value further locates an entry in the transmit data store,
the entry so found in the transmit data store defines the tranmit simplex channel associated with the forwarding data store entry that the frame was received on, and
wherein when the bridge means receive a frame from the receive simplex channel, the bridge means get with the frame from the network interface means the received network ID associated with that receive simplex channel and
wherein the bridge means go through the same train of logic to find the transmit simplex channel associated with that network.

17. The invention defined in claim 1 wherein the forwarding means are effective to forward frames based on a determination of two questions:
(1) What simplex channel is the destination on? and
(2) What simplex channel did the frame come from?

18. A method of interconnecting in a communications system multiple local area networks across backbone networks independently and transparently of protocols above the date link layer and so that the multiple local area networks appear to the users of stations of all local area networks as one large single local area network, each of the local area networks having at least one station for sending or receiving communications to or from another station using data link frames containing at least a destination address and a source address, said method comprising,
- interconnecting local area networks through a plurality of bridges with each bridge having at least one associated backbone network which comprises only simplex broadcast channels and which has one and only one transmit simplex channel associated with one or more receive simplex channels,
- defining in each bridge the transmit simplex channel and receive simplex channels of an associated backbone network in three possible topologies, i.e. non-rooted, single rooted and multi rooted, and
- learning the location of end user stations relative to each backbone network so that frames received from the backbone network can be forwarded or discarded,
- forwarding through a bridge a frame received from one station in one local area network to a designated station in another local area network across one or more backbone networks,
- selectively discarding frames received on the receive simplex channels,
- employing transmit simplex channel characteristics which are completely independent of receive simplex channel characteristics and employing characteristics of each individual receive simplex channel which are completely independent of other receive simplex channel characteristics, and
- forwarding frames across a backbone network in a way which is not required to be related to the local area network access technique or bandwidth.

19. A bridge for a communications system of the kind in which there are a plurality of local area networks with each local area network having at least one station for sending or receiving communications to or from another station using data link frames containing at least a destination address and a source address and of the kind in which multiple local area networks are interconnected across backbone networks independently and transparently of protocols above the data link layer and so that the multiple local area networks appear to the users of stations of all local area networks as one large single local area network, said bridge means comprising,
- network interface means for interfacing the bridge to related local area networks and for sending information in frame format between related local area networks across one or more backbone networks and wherein each backbone network comprises only simplex broadcast channels and has one and only one transmit simplex channel associated with one or more receive simplex channels,
- bridge management means for defining the association, in a backbone network, of the single transmit simplex channel and the receive simplex channels in three possible topologies, i.e. non-rooted, single rooted and multi rooted,
- learning means for learning the location of end user stations relative to the backbone network so that frames received from the backbone network can be forwarded or discarded,
- forwarding means for forwarding a frame received from one station in one local area network to a designated station in another local area network across one or more backbone networks independently and transparently of protocols above the date link layer,
- discarding means associated with each receive simplex channel for selectively discarding frames,
- wherein the transmit simplex channel characteristics are completely independent of receive simplex channel characteristics and the characteristics of each individual receive simplex channel are independent of other receive simplex channel characteristics, and
- wherein the backbone network is not required to be related to the local area network access technique or bandwidth.

* * * * *